US012772255B2

(12) United States Patent
Bai et al.

(10) Patent No.: US 12,772,255 B2
(45) Date of Patent: Oct. 20, 2026

(54) CONFIGURING UPLINK TRANSMISSIONS ACCORDING TO TRANSMISSION CONFIGURATION INDICATOR STATE

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 663 days.

(21) Appl. No.: 18/170,356

(22) Filed: Feb. 16, 2023

(65) Prior Publication Data

US 2024/0284475 A1 Aug. 22, 2024

(51) Int. Cl.
*H04W 72/232* (2023.01)
*H04L 5/00* (2006.01)

(52) U.S. Cl.
CPC ......... *H04W 72/232* (2023.01); *H04L 5/0048* (2013.01)

(58) Field of Classification Search
None
See application file for complete search history.

(56) References Cited

U.S. PATENT DOCUMENTS 12,127,194 B2 * 10/2024 Jang ...................... H04L 5/0053
12,267,857 B2 * 4/2025 Park ...................... H04W 72/53
2022/0345272 A1 * 10/2022 Guo ...................... H04L 5/0048
2023/0069636 A1 * 3/2023 Matsumura ........... H04L 5/0048
2023/0189250 A1 * 6/2023 Go ............................ H04L 5/14 370/329
2023/0198719 A1 * 6/2023 Wang .................... H04L 5/0048 370/329
2023/0208597 A1 * 6/2023 Yao ...................... H04B 7/0695 370/329

(Continued)

OTHER PUBLICATIONS

International Search Report and Written Opinion—PCT/US2024/014864—ISA/EPO—May 31, 2024 (2302248WO).

(Continued)

*Primary Examiner* — Duc T Duong
(74) *Attorney, Agent, or Firm* — QUALCOMM Incorporated

(57) ABSTRACT

Methods, systems, and devices for wireless communications are described. The described techniques provide for a user equipment (UE) to identify transmission parameters according to a transmission configuration indicator (TCI) state associated with a sounding reference signal (SRS) resource set, a transmission and reception points (TRP) of a network entity, a control resource set (CORESET) pool identifier (ID), or a combination thereof. For example, the network entity may indicate one or more SRS resource set configurations which configure respective a TCI state for one or more SRS resource sets and may indicate the TCI state is associated with a CORESET pool ID. In some cases, UE may identify the TCI state indicated in the activation message, may associate the TCI state with the CORESET pool ID indicated in the activation message, and may identify an SRS resource set configured with a corresponding TCI state.

30 Claims, 14 Drawing Sheets

(56) References Cited

U.S. PATENT DOCUMENTS

| | | | | |
|---|---|---|---|---|
| 2023/0216565 A1* | 7/2023 | Kwak | H04B 7/088 | |
| | | | 375/267 | |
| 2023/0328539 A1* | 10/2023 | Matsumura | H04W 16/28 | |
| 2024/0113825 A1* | 4/2024 | Koskela | H04L 5/0094 | |
| 2024/0114523 A1* | 4/2024 | Lee | H04W 72/23 | |
| 2024/0154765 A1* | 5/2024 | Cirik | H04L 5/001 | |
| 2024/0187199 A1* | 6/2024 | Gao | H04L 5/0094 | |
| 2024/0188097 A1* | 6/2024 | Wang | H04L 1/08 | |
| 2024/0195483 A1* | 6/2024 | Jang | H04B 7/0404 | |
| 2025/0039917 A1* | 1/2025 | Matsumura | H04L 5/0053 | |
| 2026/0031960 A1* | 1/2026 | Li | H04L 5/0048 | |

OTHER PUBLICATIONS

Moderator (Intel Corporation): "Summary#1 of Al: 8.1.2.4 Enhancements on HST-SFN Deployment", 3GPP TSG RAN WG1 #106-e, R1-2108326, 3rd Generation Partnership Project (3GPP), Mobile Competence Centre, 650, Route Des Lucioles, F-06921 Sophia-Antipolis Cedex, France, vol. RAN WG1, No. e-meeting, Aug. 16, 2021-Aug. 27, 2021, Aug. 18, 2021, XP052042134, 63 Pages, Sections 2.4.1, 2.4.6, 2.4.7.

VIVO: "Discussion on Unified TCI Framework Extension for Multi-TRP", 3GPP TSG RAN WG1 #110, R1-2206024, 3rd Generation Partnership Project, Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 12, 2022, XP052273957, 20 Pages, Sections 2.2, 2.3.1, 2.5, 2.5.1.

* cited by examiner

CONFIGURING UPLINK TRANSMISSIONS ACCORDING TO TRANSMISSION CONFIGURATION INDICATOR STATE

FIELD OF TECHNOLOGY

The following relates to wireless communications, including configuring uplink transmissions according to transmission configuration indicator state.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE).

In some cases, a network entity may communicate with a UE using multiple transmission and reception points (TRPs), and may schedule simultaneous uplink transmissions from the UE to the multiple TRPs. For example, each TRP may transmit downlink control information (DCI) scheduling a respective uplink transmission from the UE.

SUMMARY

The described techniques relate to improved methods, systems, devices, and apparatuses that support configuring uplink transmissions according to transmission configuration indicator state. For example, the described techniques provide for a user equipment (UE) identifying transmission parameters according to one or more transmission configuration indicator (TCI) states associated with sounding reference signal (SRS) resource sets, transmission and reception points (TRPs) of a network entity, control resource set (CORESET) pool identifiers (IDs), or a combination thereof. For example, the network entity may indicate one or more SRS resource set configurations which configure respective a TCI state for the one or more SRS resource sets. Additionally, the network entity may activate a TCI state for a TRP, and may transmit an activation message to the UE that indicates the TCI state for the TRP and indicates a CORESET pool ID. In some cases, UE may identify the TCI state indicated in the activation message, may associate the TCI state with the CORESET pool ID indicated in the activation message, and may identify an SRS resource set configured with a corresponding TCI state (e.g., the same TCI state) according to the SRS resource set configuration, which may support simultaneous uplink transmission.

A method for wireless communication at a UE is described. The method may include receiving an indication of a set of multiple resource set configurations, each resource set configuration of the set of multiple resource set configurations corresponding to a respective reference signal resource set of a set of multiple reference signal resource sets, receiving a set of multiple downlink control information (DCI) messages, each DCI message of the set of multiple DCI messages received via a respective control resource set (CORESET) of a set of multiple CORESETs, each CORESET associated with a respective CORESET ID of a set of multiple CORESET IDs, and transmitting a set of multiple physical uplink shared channel (PUSCH) messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

An apparatus for wireless communication at a UE is described. The apparatus may include a processor, memory coupled with the processor, and instructions stored in the memory. The instructions may be executable by the processor to cause the apparatus to receive an indication of a set of multiple resource set configurations, each resource set configuration of the set of multiple resource set configurations corresponding to a respective reference signal resource set of a set of multiple reference signal resource sets, receive a set of multiple DCI messages, each DCI message of the set of multiple DCI messages received via a respective CORESET of a set of multiple CORESETs, each CORESET associated with a respective CORESET ID of a set of multiple CORESET IDs, and transmit a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

Another apparatus for wireless communication at a UE is described. The apparatus may include means for receiving an indication of a set of multiple resource set configurations, each resource set configuration of the set of multiple resource set configurations corresponding to a respective reference signal resource set of a set of multiple reference signal resource sets, means for receiving a set of multiple DCI messages, each DCI message of the set of multiple DCI messages received via a respective CORESET of a set of multiple CORESETs, each CORESET associated with a respective CORESET ID of a set of multiple CORESET IDs, and means for transmitting a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

A non-transitory computer-readable medium storing code for wireless communication at a UE is described. The code may include instructions executable by a processor to receive an indication of a set of multiple resource set configurations, each resource set configuration of the set of multiple resource set configurations corresponding to a respective reference signal resource set of a set of multiple reference signal resource sets, receive a set of multiple DCI messages, each DCI message of the set of multiple DCI messages received via a respective CORESET of a set of multiple CORESETs, each CORESET associated with a respective CORESET ID of a set of multiple CORESET IDs, and transmit a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

Some examples of the method, apparatuses, and non-transitory computer-readable medium described herein may further include operations, features, means, or instructions for receiving, from a first TRP configured for the UE, a first message including a first CORESET ID of the set of multiple CORESET IDs and activating a first TCI state for the first CORESET ID, the first CORESET ID corresponding to a first CORESET of the set of multiple CORESETs and receiving, from a second TRP configured for the UE, a second message including a second CORESET ID of the set of multiple CORESET IDs and activating a second TCI state for the second CORESET ID, the second CORESET ID corresponding to a second CORESET of the set of multiple CORESETs.

In some examples of the method, apparatuses, and non-transitory computer-readable medium described herein, receiving the set of multiple DCI messages may include operations, features, means, or instructions for receiving, via the first CORESET and from the first TRP, a first DCI message of the set of multiple DCI messages, where the first DCI message schedules a first PUSCH message of the set of multiple PUSCH messages and receiving, via the second CORESET and from the second TRP, a second DCI message of the set of multiple DCI messages, where the second DCI message schedules a second PUSCH message of the set of multiple PUSCH messages.

In some examples of the method, apparatuses, and non-transitory computer-readable medium described herein, the first TCI state may be associated with the first CORESET ID and may be configured for a first reference signal resource set of the set of multiple reference signal resource sets by a first resource set configuration of the set of multiple resource set configurations; and the second TCI state may be associated with the second CORESET ID and may be configured for a second reference signal resource set of the set of multiple reference signal resource sets by a second reference signal resource set configuration of the set of multiple resource set configurations.

In some examples of the method, apparatuses, and non-transitory computer-readable medium described herein, transmitting the set of multiple PUSCH messages may include operations, features, means, or instructions for transmitting the first PUSCH message, where the one or more communication parameters associated with the first PUSCH message may be based on the first reference signal resource set and transmitting the second PUSCH message, where the one or more communication parameters associated with the second PUSCH message may be based on the second reference signal resource set.

Some examples of the method, apparatuses, and non-transitory computer-readable medium described herein may further include operations, features, means, or instructions for receiving a first configuration associated with a first bandwidth part (BWP), the first configuration indicating a set of TCI states associated with the first BWP, receiving a message activating a second BWP for communications by the UE, and communicating, via the second BWP, according to at least one TCI state of the set of TCI states associated with the first BWP.

Some examples of the method, apparatuses, and non-transitory computer-readable medium described herein may further include operations, features, means, or instructions for receiving a second configuration associated with the second BWP, where communicating according to the at least one TCI state may be based on the second configuration indicating the first BWP.

Some examples of the method, apparatuses, and non-transitory computer-readable medium described herein may further include operations, features, means, or instructions for receiving a second set of TCI states associated with the second BWP, where: the set of TCI states may be associated with uplink communications and the second set of TCI states may be associated with downlink communications; or the set of TCI states may be associated with downlink communications and the second set of TCI states may be associated with uplink communications.

A method for wireless communication at a network entity is described. The method may include transmitting, to a UE configured with a set of multiple TRPs, an indication of a set of multiple resource set configurations, each resource set configuration of the set of multiple resource set configurations corresponding to a respective reference signal resource set of a set of multiple reference signal resource sets, transmitting, via the set of multiple TRPs, a set of multiple DCI messages, each DCI message of the set of multiple DCI messages transmitted via a respective CORESET of a set of multiple CORESETs, each CORESET associated with a respective CORESET ID of a set of multiple CORESET IDs, and receiving, via the set of multiple TRPs, a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

An apparatus for wireless communication at a network entity is described. The apparatus may include a processor, memory coupled with the processor, and instructions stored in the memory. The instructions may be executable by the processor to cause the apparatus to transmit, to a UE configured with a set of multiple TRPs, an indication of a set of multiple resource set configurations, each resource set configuration of the set of multiple resource set configurations corresponding to a respective reference signal resource set of a set of multiple reference signal resource sets, transmit, via the set of multiple TRPs, a set of multiple DCI messages, each DCI message of the set of multiple DCI messages transmitted via a respective CORESET of a set of multiple CORESETs, each CORESET associated with a respective CORESET ID of a set of multiple CORESET IDs, and receive, via the set of multiple TRPs, a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

Another apparatus for wireless communication at a network entity is described. The apparatus may include means for transmitting, to a UE configured with a set of multiple TRPs, an indication of a set of multiple resource set configurations, each resource set configuration of the set of multiple resource set configurations corresponding to a respective reference signal resource set of a set of multiple reference signal resource sets, means for transmitting, via the set of multiple TRPs, a set of multiple DCI messages, each DCI message of the set of multiple DCI messages transmitted via a respective CORESET of a set of multiple CORESETs, each CORESET associated with a respective CORESET ID of a set of multiple CORESET IDs, and means for receiving, via the set of multiple TRPs, a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

A non-transitory computer-readable medium storing code for wireless communication at a network entity is described. The code may include instructions executable by a processor to transmit, to a UE configured with a set of multiple TRPs, an indication of a set of multiple resource set configurations, each resource set configuration of the set of multiple resource set configurations corresponding to a respective reference signal resource set of a set of multiple reference signal resource sets, transmit, via the set of multiple TRPs, a set of multiple DCI messages, each DCI message of the set of multiple DCI messages transmitted via a respective CORESET of a set of multiple CORESETs, each CORESET associated with a respective CORESET ID of a set of multiple CORESET IDs, and receive, via the set of multiple TRPs, a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

Some examples of the method, apparatuses, and non-transitory computer-readable medium described herein may further include operations, features, means, or instructions for transmitting, via a first TRP of the set of multiple TRPs, a first message including a first CORESET ID of the set of multiple CORESET IDs and activating a first TCI state for the first CORESET ID, the first CORESET ID corresponding to a first CORESET of the set of multiple CORESETs and transmitting, via a second TRP of the set of multiple TRPs, a second message including a second CORESET ID of the set of multiple CORESET IDs and activating a second TCI state for the second CORESET ID, the second CORESET ID corresponding to a second CORESET of the set of multiple CORESETs.

In some examples of the method, apparatuses, and non-transitory computer-readable medium described herein, transmitting the set of multiple DCI messages may include operations, features, means, or instructions for transmitting, via the first TRP in the first CORESET, a first DCI message of the set of multiple DCI messages, where the first DCI message schedules a first PUSCH message of the set of multiple PUSCH messages and transmitting, via the second TRP in the second CORESET, a second DCI message of the set of multiple DCI messages, where the second DCI message schedules a second PUSCH message of the set of multiple PUSCH messages.

In some examples of the method, apparatuses, and non-transitory computer-readable medium described herein, the first TCI state may be associated with the first CORESET ID and may be configured for a first reference signal resource set of the set of multiple reference signal resource sets by a first resource set configuration of the set of multiple resource set configurations; and the second TCI state may be associated with the second CORESET ID and may be configured for a second reference signal resource set of the set of multiple reference signal resource sets by a second reference signal resource set configuration of the set of multiple resource set configurations.

In some examples of the method, apparatuses, and non-transitory computer-readable medium described herein, receiving the set of multiple PUSCH messages may include operations, features, means, or instructions for receiving the first PUSCH message, where the one or more communication parameters associated with the first PUSCH message may be based on the first reference signal resource set and receiving the second PUSCH message, where the one or more communication parameters associated with the second PUSCH message may be based on the second reference signal resource set.

Some examples of the method, apparatuses, and non-transitory computer-readable medium described herein may further include operations, features, means, or instructions for transmitting a first configuration associated with a first BWP, the first configuration indicating a set of TCI states associated with the first BWP, transmitting a message activating a second BWP for communications by the UE, and communicating, via the second BWP, according to at least one TCI state of the set of TCI states associated with the first BWP.

Some examples of the method, apparatuses, and non-transitory computer-readable medium described herein may further include operations, features, means, or instructions for transmitting a second configuration associated with the second BWP, where communicating according to the at least one TCI state may be based on the second configuration indicating the first BWP.

Some examples of the method, apparatuses, and non-transitory computer-readable medium described herein may further include operations, features, means, or instructions for transmitting, to the UE, a second set of TCI states associated with the second BWP, where: the set of TCI states may be associated with uplink communications and the second set of TCI states may be associated with downlink communications; or the set of TCI states may be associated with downlink communications and the second set of TCI states may be associated with uplink communications.

DETAILED DESCRIPTION

Figure 1:
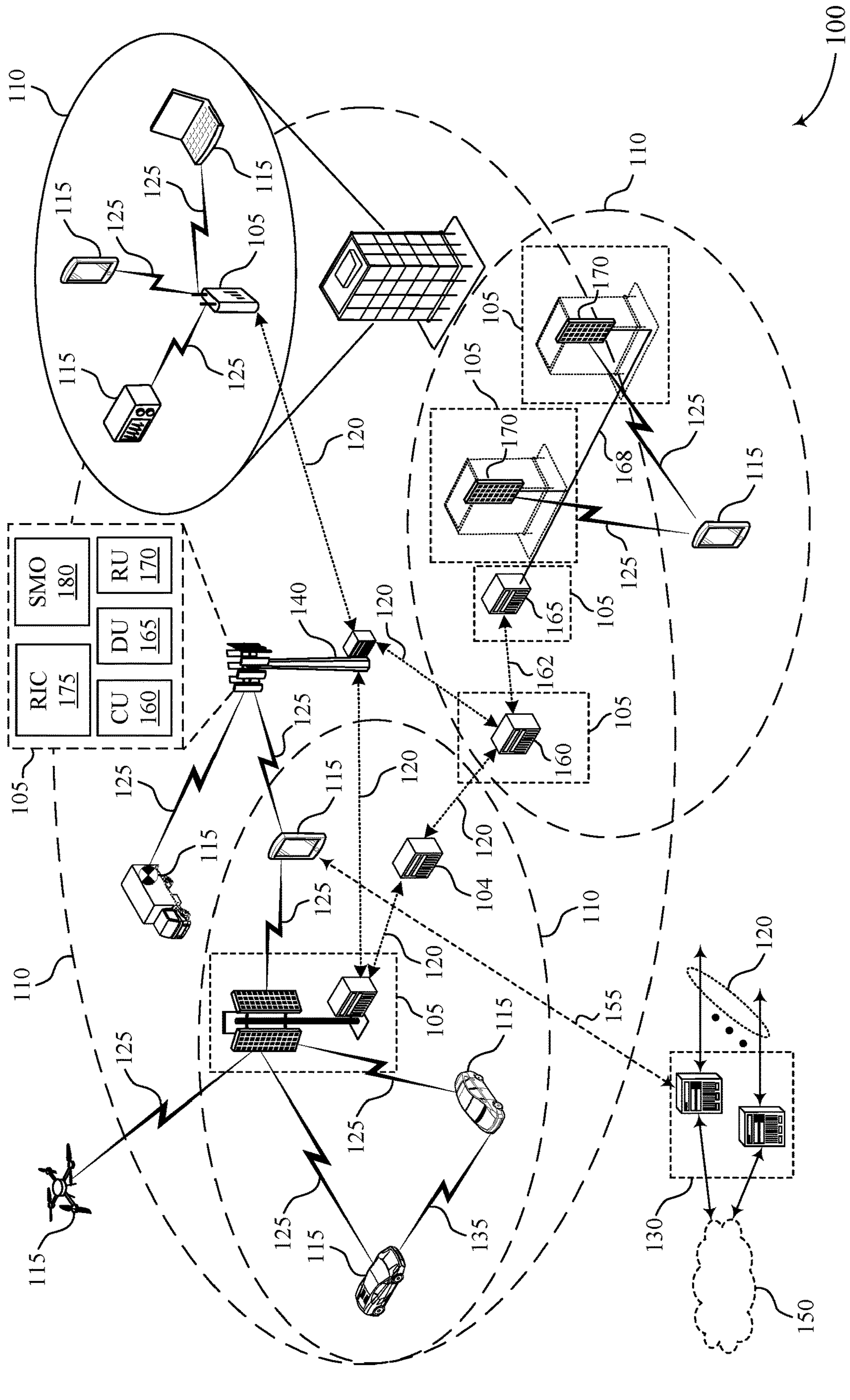
FIG. 1 illustrates an example of a wireless communications system that supports configuring uplink transmissions according to transmission configuration indicator state in accordance with one or more aspects of the present disclosure.

In some wireless communications systems, a network entity may communicate with a user equipment (UE) using multiple transmission and reception points (TRPs). For example, the network entity may transmit downlink control information (DCI) from each TRP to schedule simultaneous uplink transmissions from the UE. In some examples, each TRP may be associated with a control resource set (CORESET) pool that has a respective CORESET pool identifier (ID). In some cases, the UE may transmit the simultaneous uplink transmissions (e.g., via multiple antenna panels) according to transmission configurations associated with reference signal resource sets, such as sounding reference signal (SRS) resource sets. For example, the UE may transmit a first uplink transmission according to a transmission configuration of a first SRS resource set and may transmit a second uplink transmission according to a transmission configuration of a second SRS resource set, where the first SRS resource set may be associated with a first CORESET pool ID (e.g., coresetPoolIndex 0) and the second SRS resource set may be associated with second CORESET pool ID (e.g., coresetPoolIndex 1). However, techniques for associating the SRS resource sets with the CORESET pool IDs, such as an explicit association in a SRS resource set configuration or according to an ordering of SRS resource set IDs, may be relatively inflexible.

To support associating SRS resource sets with CORESET pool IDs, a UE may identify one or more transmission configuration indicator (TCI) states associated with SRS resource sets, TRPs of a network entity, CORESET pool IDs, or a combination thereof. For example, the network entity may indicate one or more SRS resource set configurations which configure respective TCI states for the one or more SRS resource sets. Additionally, the network entity may activate a TCI state for a TRP, and may transmit an activation message to the UE that indicates the TCI state for the TRP (e.g., for a CORESET pool ID). In some cases, UE may identify the TCI state indicated in the activation message, may associate the TCI state with the CORESET pool ID indicated in the activation message, and may identify an SRS resource set configured with a corresponding TCI state (e.g., the same TCI state) according to the SRS resource set configuration, which may support simultaneous uplink transmission. For example, the UE may receive a first DCI from a first TRP via a first CORESET pool and a second DCI from a second TRP via a second CORESET pool, and may identify an SRS resource set transmission configuration for each uplink transmission according to CORESET pool IDs associated with each CORESET pool (e.g., according to a corresponding TCI state).

Aspects of the disclosure are initially described in the context of wireless communications systems. Aspects of the disclosure are further illustrated by and described with reference to a bandwidth part (BWP) configuration and a process flow. Aspects of the disclosure are further illustrated by and described with reference to apparatus diagrams, system diagrams, and flowcharts that relate to configuring uplink transmissions according to TCI state.

FIG. 1 illustrates an example of a wireless communications system 100 that supports configuring uplink transmissions according to TCI state in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support configuring uplink transmissions according to TCI state as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an ID for distinguishing neighboring cells (e.g., a physical cell ID (PCID), a virtual cell ID (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, a network entity 105 may configure a UE 115 with one or more TCI states to support beamforming communications. For example, the network entity may configure a pool of TCI states (e.g., unified TCI states) via an RRC configuration and may activate one or more TCI states of the pool of TCI states via a MAC-CE message. In some cases, the network entity 105 may indicate, to the UE 115, a TCI state of the one or more activated TCI states via a DCI message (e.g., using DCI format 1_1 or DCI format 1_2). For example, the network entity 105 may transmit a DCI indicating the TCI state and scheduling a downlink assignment (e.g., a scheduling DCI), which may include a TCI field indicating the TCI state. As another example, the network entity 105 may transmit a DCI indicating the TCI state and not scheduling a downlink assignment (e.g., a dedicated DCI for indicating TCI state), which may include multiple fields indicating a sequence of values associated with TCI indication (e.g., which may include invalid codewords). The multiple fields may include a redundancy version (RV) field (e.g., RV all '1's), a modulation and coding scheme (MCS) field (e.g., MCS=all '1's), a new data indicator (NDI) field (e.g., NDI=0), a frequency domain resource allocation (FDRA) field (e.g., FDRA=all '0's for FDRA Type 0, all '1's for FDRA Type 1, or all '0's for dynamicSwitch), a TCI field (e.g., indicating a TCI state ID for the TCI state), or any combination thereof. Based on identifying the sequence indicated by the multiple fields, the UE 115 may determine that the DCI is dedicated for TCI state indication.

The configured TCI states may be associated with various TCI state types to indicate wireless channels for beamforming communications. For example, a first type of TCI state may be associated with downlink communications (e.g., applies to at least a dedicated physical downlink shared channel (PDSCH) or a dedicated physical downlink control channel (PDCCH) for the UE 115), a second type of TCI state may be associated with uplink communications (e.g., applies to at least a dedicated physical uplink shared channel (PUSCH) (e.g., dynamic grant based or configured grant based) or a dedicated physical uplink control channel (PUCCH) for the UE 115), and a third type of TCI state may be associated with joint uplink and downlink communications (e.g., applies to at least a dedicated PDSCH, a dedicated PDCCH, a dedicated PUSCH, or a dedicated PUCCH).

Additionally, the types of TCI states may be configured to indicate (e.g., via RRC) one or more optional parameters for beamforming communications. For example, the first type may indicate a non-UE 115 dedicated PSDCH, a non-UE 115 dedicated PDCCH, an aperiodic CSI-RS for CSI reporting, an aperiodic CSI-RS for beam management, or any combination thereof. The second type may indicate an SRS associated with a conjugate beamforming (CB) scheme, an SRS associated with a normalized conjugate beamforming (NCB) scheme, antenna switching parameters, an aperiodic SRS associated with beam management, or any combination thereof. The third type may indicate a non-UE 115 dedicated PSDCH, a non-UE 115 dedicated PDCCH, an aperiodic CSI-RS for CSI reporting, an aperiodic CSI-RS for beam management, an SRS associated with a CB scheme, an SRS associated with a NCB scheme, antenna switching parameters, an aperiodic SRS associated with beam management, or any combination thereof.

In some cases, the network entity 105 may transmit a DCI (e.g., a single DCI) to schedule communications from multiple TRPs associated with the network entity 105 and indicate one or more TCI states to the UE 115. For example, the MAC-CE message activating one or more TCI states may map a set of TCI states (e.g., a pair for two TRPs) to the multiple TRPs according to a TCI codepoint (e.g., associated with a TCI codepoint index indicated by the DCI). The DCI may communicate using a set of beams associated with the set of TCI states (e.g., a pair of beams for two TRPs). Based on a type of communication, the network entity 105 may use a subset of the set of TCI states (e.g., one TCI state) or may use the set of TCI states (e.g., both TCI states). In some cases, the network entity 105 may (or may not) configure a CORESET pool, and the UE may (or may not) be aware of the association between the multiple TRPs and the set of TCI states.

Figure 2:
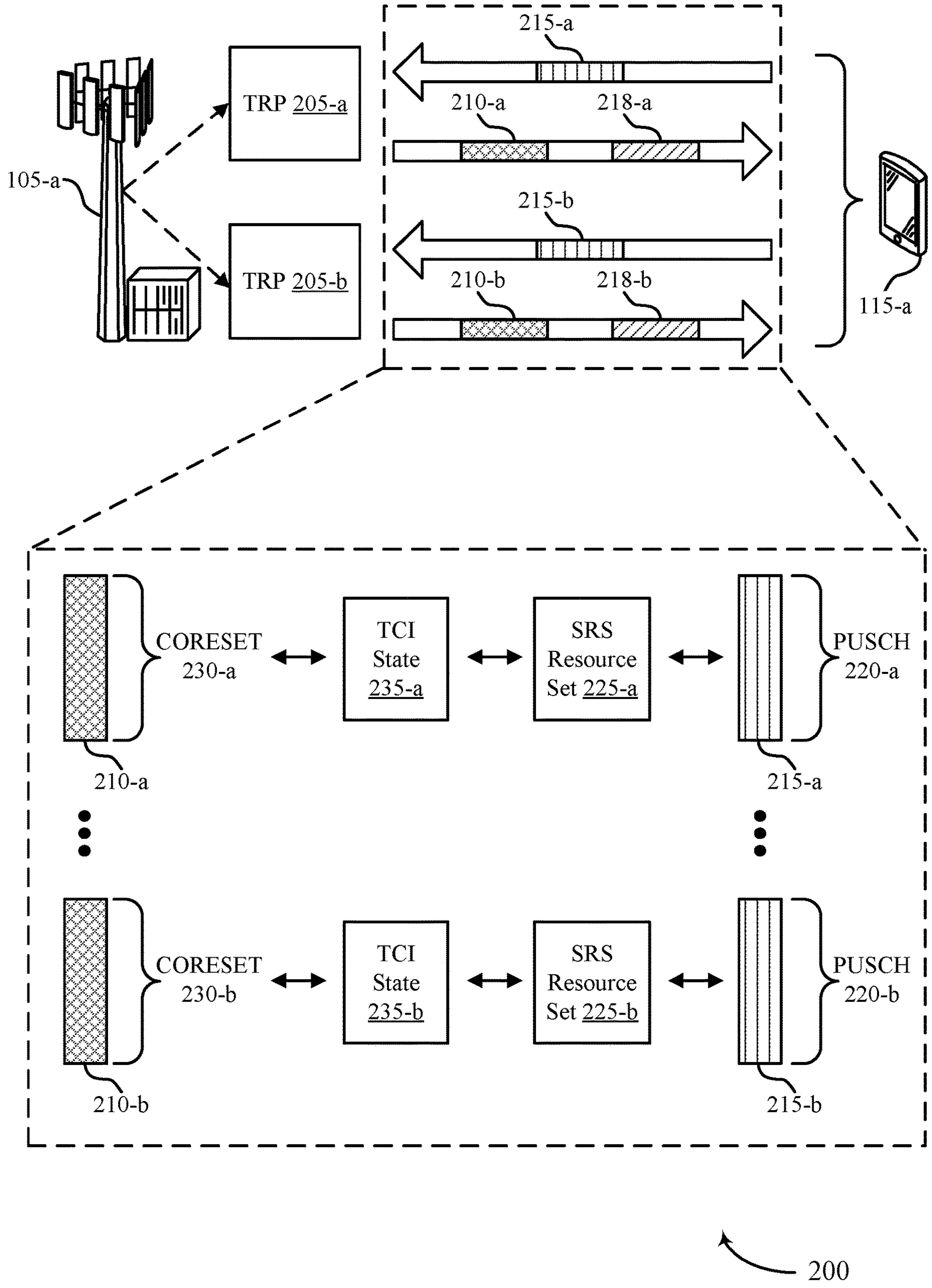
FIG. 2 illustrates an example of a wireless communications system that supports configuring uplink transmissions according to transmission configuration indicator state in accordance with one or more aspects of the present disclosure.

In some other examples, the network entity 105 may transmit multiple DCIs (e.g., from each respective TRP) to schedule communications with the multiple TRPs, as described further with reference to FIG. 2.

In some cases, the UE 115 may determine a transmission configuration for an uplink transmission according to an SRS resource set. The network entity 105 may associate a first SRS resource set with a first CORESET pool ID (e.g., coresetPoolIndex 0) and may associate a second SRS resource set with a second CORESET pool ID (e.g., coresetPoolIndex 1). To support such an association, the UE 115 may identify a TCI state for a CORESET pool ID (e.g., which may be indicated in the activation MAC-CE), and may identify an SRS resource set associated with a corresponding TCI state (e.g., the same TCI state).

FIG. 2 illustrates an example of a wireless communications system 200 that supports configuring uplink transmissions according to TCI state in accordance with one or more aspects of the present disclosure. The wireless communications system 200 may implement one or more aspects of the wireless communications system 100. For example, the wireless communications system 200 may include a network entity 105-*a* and a UE 115-*a*, which may be examples of corresponding devices described with reference to FIG. 1. The wireless communications system 200 may support the UE 115-*a* identifying a transmission configuration for an uplink transmission according to a correspondence between SRS resource sets and CORESET pool IDs, which may be based on one or more TCI states.

The network entity 105-*a* may be associated with multiple TRPs 205, such as a TRP 205-*a* and a TRP 205-*b*. In some cases, the multiple TRPs 205 may transmit respective DCIs 210 to schedule at least two simultaneous PUSCH transmissions 215 from the UE 115-*a* (e.g., a simultaneous transmission from multiple panels (STxMP)). For example, the TRP 205-*a* may transmit a DCI 210-*a* to schedule a PUSCH transmission 215-*a* and the TRP 205-*b* may transmit a DCI 210-*b* to schedule a PUSCH transmission 215-*b*. In some cases, the UE 115-*a* may determine one or more communication parameters for the PUSCH transmissions 215 according to a transmission configuration for an SRS resource set 225. For example, the one or more communication parameters for the PUSCH transmission 215-*a* may be determined according to a transmission configuration for an SRS resource set 225-*a* and the one or more communication parameters for the PUSCH transmission 215-*b* may be determined according to a transmission configuration for an SRS resource set 225-*b*.

To identify a SRS resource set 225 (e.g., to determine communication parameters for a corresponding PUSCH transmission 215), the network entity 105-*a* may associate the SRS resource set 225 with a CORESET pool ID associated with a CORESET 230. For example, a first SRS resource set 225 (e.g., the SRS resource set 225-*a* or the SRS resource set 225-*b*) may be mapped to a first CORESET pool ID (e.g., associated with the CORESET 230-*a* or the CORESET 230-*b*), and a second SRS resource set 225 (e.g., the SRS resource set 225-*a* or the SRS resource set 225-*b*) may be mapped to a second CORESET pool ID (e.g., associated with the CORESET 230-*a* or the CORESET 230-*b*).

In some cases, the network entity 105-*a* may implement various techniques to determine which SRS resource set 225 to associate with each respective CORESET pool ID. For instance, the network entity 105-*a* may configure a CORESET pool ID for an SRS resource set 225 as part of an SRS resource set configuration (e.g., an explicit indication). Additionally, or alternatively, the network entity 105-*a* may associate SRS resource sets 225 with CORESET pool IDs according to an ordering of SRS resource set IDs associated with the SRS resource sets 225 (e.g., CORESET pool ID 0 being associated with an SRS resource set having a lowest index, CORESET pool ID 1 being associated with an SRS resource set having the next lowest index, and so on). Such techniques, however, may limit a flexibility of the network entity 105-*a* (e.g., when updating configurations for additional SRS resource sets or TRPs). In some cases, the network entity 105-*a* may associate SRS resource sets 225 with CORESET pool IDs according to a TCI state 235, which may improve the flexibility of the system.

The TRP 205-*a* and the TRP 205-*b* may be associated with a CORESET 230-*a* and a CORESET 230-*b* (e.g., CORESET pools), respectively, each of which may be associated with a respective CORESET pool ID. For example, the TRP 205-*a* may transmit the DCI 210-*a* via the CORESET 230-*a* (e.g., a PDCCH) to schedule the PUSCH transmission 215-*a* and the TRP 205-*b* may transmit the DCI 210-*b* via the CORESET 230-*b* (e.g., a PDCCH) to schedule the PUSCH transmission 215-*b*.

Additionally, each TRP 205 may be associated with a set of one or more TCI states 235 (e.g., activated TCI states 235 from RRC configured TCI state pools). In some cases, the TRPs 205 may transmit a respective activation MAC-CE 240, which may activate the one or more TCI states 235 and may indicate a CORESET pool ID associated with the TRPs 205. For example, the TRP 205-*a* may transmit a MAC-CE 240-*a*, which may activate at least a TCI state 235-*a* and may indicate a first CORESET pool ID associated with the TRP 205-*a*, and the TRP 205-*b* may transmit a MAC-CE 240-*b*, which may activate at least a TCI state 235-*b* and may indicate a second CORESET pool ID associated with the TRP 205-*b*. In some cases, a source RS (e.g., a CSI-RS) of each TCI state 235 may be associated with the TRPs 205, the CORESET pool IDs, or both.

In some examples, the UE 115-*a* may identify the TCI states 235 based on receiving the DCIs 210. For example, the UE 115-*a* may receive the DCI 210-*a* via the CORESET 230-*a*, and may identify the activated TCI state 235-*a* associated with a CORESET pool ID of the CORESET 230-*a* (e.g., the first CORESET pool ID). Similarly, the UE 115-*a* may receive the DCI 210-*b* via the CORESET 230-*b*, and may identify the activated TCI state 235-*b* associated with a CORESET pool ID of the CORESET 230-*b* (e.g., the second CORESET pool ID). Additionally, or alternatively, the UE 115-*a* may identify one or more SRS resource set configurations for one or more respective SRS resource sets, which may indicate respective TCI states 235 associated with the one or more respective SRS resource sets. In some cases, the UE 115-*a* may receive an indication of the one or more SRS resource set configurations (e.g., preconfigured via RRC). For example, the UE 115-*a* may receive an indication of a first SRS resource set configuration 218-*a* that configures the TCI state 235-*a* for the SRS resource set 225-*a* and a second SRS resource set configuration 218-*b* that configures the TCI state 235-*b* for the SRS resource set 225-*b*.

In some examples, the UE 115-*a* may transmit the PUSCH transmission 215-*a* and the PUSCH transmission 215-*b* based on the association between SRS resource sets 225 and CORESET pool IDs according to a TCI state 235. For example, the UE 115-*a* may identify the TCI state 235-*a* from the first CORESET pool ID and may identify the SRS resource set 225-*a* (e.g., providing a transmission configuration for the PUSCH transmission 215-*a*) based on the TCI state 235-*a*. Similarly, the UE 115-*a* may identify the TCI state 235-*b* from the second CORESET pool ID and may identify the SRS resource set 225-*b* (e.g., providing a transmission configuration for the PUSCH transmission 215-*b*) based on the TCI state 235-*b*. Such techniques may improve the flexibility of the network entity 105-*a*, for example, to reconfigure associations between SRS resource sets and TRPs 205. The UE 115-*a* may transmit the PUSCH transmission 215-*a* via PUSCH 220-*a* and the PUSCH transmission 215-*b* via PUSCH 220-*b* (e.g., in time allocations that may be at least partially overlapping).

Figure 3:
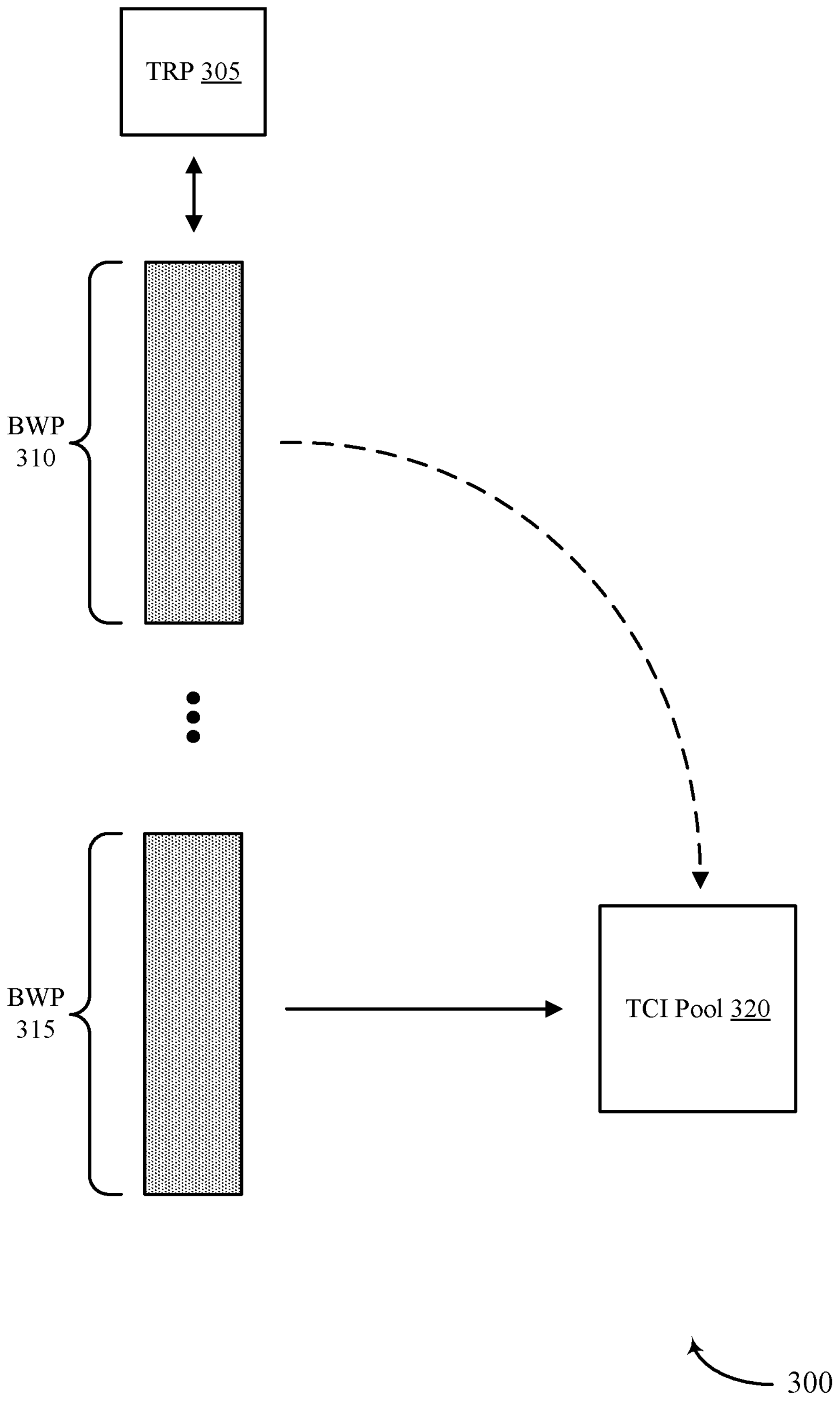
FIG. 3 illustrates an example of a bandwidth part (BWP) configuration that supports configuring uplink transmissions according to transmission configuration indicator state in accordance with one or more aspects of the present disclosure.

FIG. 3 illustrates an example of a BWP configuration 300 that supports configuring uplink transmissions according to TCI state in accordance with one or more aspects of the present disclosure. The BWP configuration 300 may be implemented by one or more aspects of the wireless communications system 100 and the wireless communications system 200. For example, the BWP configuration may include a TRP 305 associated with a network entity 105, which may be an example of the TRP 205-*a* or the TRP 205-*b* described with reference to FIG. 2.

In some cases, the network entity 105 may configure a BWP 310 and a BWP 315 with a first BWP configuration and a second BWP configuration, respectively. For example, the first BWP configuration may configure a TCI pool 320 (e.g., a set of TCI states according to explicitlist) for use with the BWP 310, and the second BWP configuration may not configure a TCI pool for the BWP 315 and may indicate a reference BWP, such as the BWP 310. In some cases, the reference BWP may be configured for a BWP based on a type of the TCIs associated with the reference BWP. For example, a first reference BWP (e.g., the BWP 310 or another BWP) may correspond to an uplink TCI pool and a second reference BWP (e.g., the BWP 310 or another BWP) may correspond to a downlink TCI pool. In some cases, an uplink TCI pool may be configured for a BWP and a downlink TCI pool may be identified for the BWP based on a reference BWP. Additionally or alternatively, a downlink TCI pool may be configured for a BWP and an uplink TCI pool may be identified for the BWP based on a reference BWP.

The TRP 305 may communicate with a UE 115 via the BWP 315. In some cases, such as when the BWP 315 is not configured with a TCI pool (e.g., an uplink TCI pool or a downlink TCI pool), a TCI state for communications may be determined according to the reference BWP (e.g., the BWP 310) or a serving cell indicated by the second BWP configuration. Alternatively, if the BWP is configured with a TCI pool (e.g., an uplink TCI pool or a downlink TCI pool), the TRP 305 may communicate with the UE 115 according to a TCI state of the TCI pool (e.g., associated with the BWP 315 and a serving cell of the BWP 315). In some cases, such as when a joint uplink and downlink TCI state is used for communication, the BWP configuration may indicate separate fields for a downlink BWP ID and a cell ID (e.g., due to SRS being configured for an uplink BWP and joint TCI states being configured in a downlink BWP).

Figure 4:
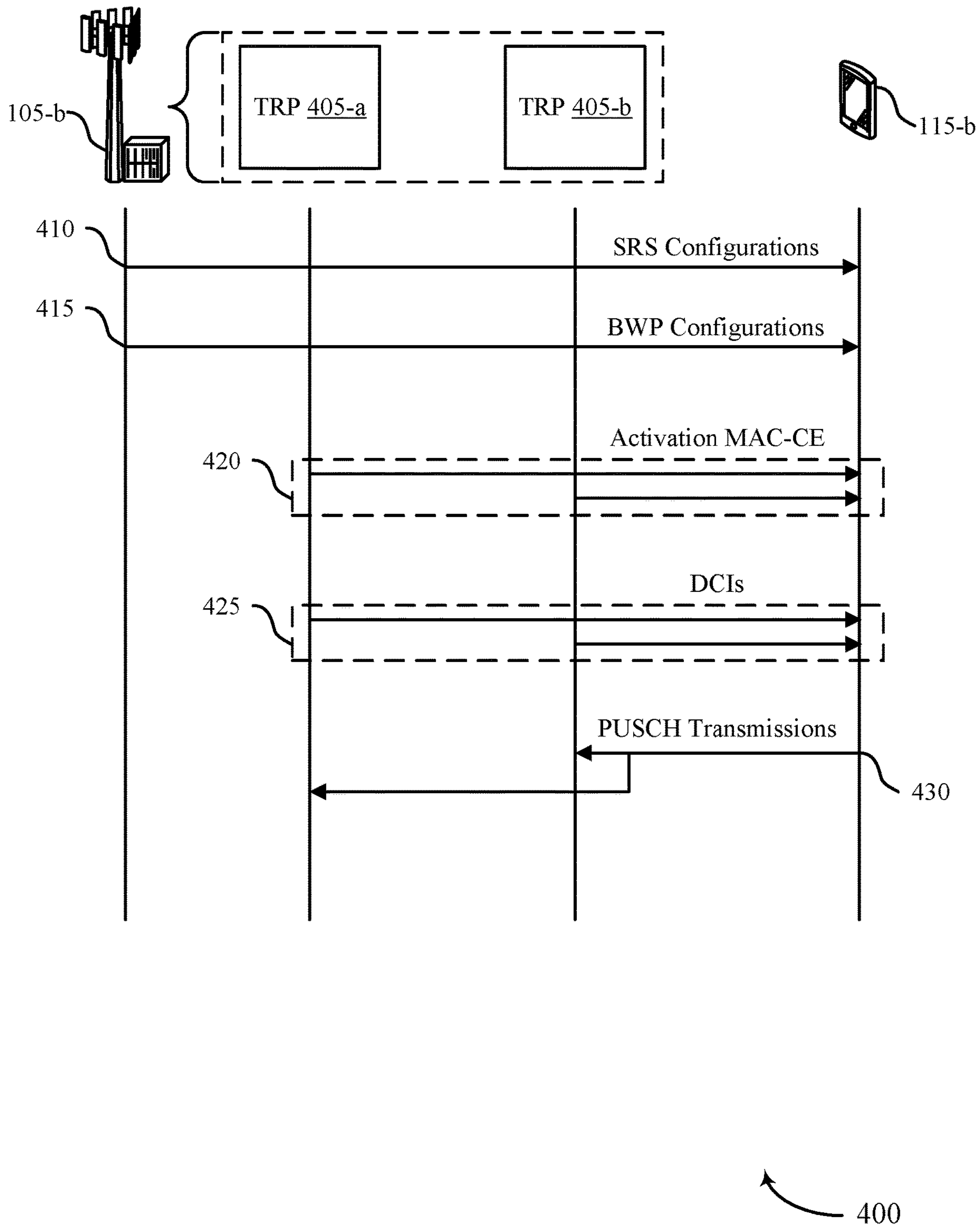
FIG. 4 illustrates an example of a process flow that supports configuring uplink transmissions according to transmission configuration indicator state in accordance with one or more aspects of the present disclosure.

FIG. 4 illustrates an example of a process flow 400 that supports configuring uplink transmissions according to TCI state in accordance with one or more aspects of the present disclosure. The process flow 400 may be implemented by one or more aspects of the wireless communications system 100 and the wireless communications system 200. For example, the process flow 400 may include a network entity 105-*b* that is associated with a TRP 405-*a* and a TRP 405-*b*, and may include a UE 115-*b*, which may be examples of corresponding devices described with reference to FIGS. 1 and 2. The process flow 400 may support the UE 115-*b* identifying communication parameters for multiple uplink transmissions according to a TCI state that associates an SRS resource set with a CORESET pool ID. Alternative examples of the following may be implemented, where some processes are performed in a different order than described or are not performed. In some cases, processes may include additional features not mentioned below, or further processes may be added.

At 410, the network entity 105-*b* may transmit, to the UE 115-*b*, an indication of multiple resource set configurations, where each resource set configuration of the multiple resource set configurations may correspond to a respective reference signal resource set (e.g., an SRS resource set) of multiple reference signal resource sets. In some cases, each respective resource set configuration may configure a corresponding reference signal resource set with one or more TCI states. For example, a first resource set configuration may configure a first TCI state for a first reference signal resource set and a second resource set configuration may configure a second TCI state for a second reference signal resource set.

At 415, the network entity 105-*b* may transmit, to the UE 115-*b*, one or more BWP configurations. For example, the UE 115-*a* may receive a first configuration associated with a first BWP that indicates a first set of TCI states associated with the first BWP and may receive a second configuration associated with a second BWP. In some cases, the second configuration may indicate the first BWP (e.g., a reference BWP). Additionally, or alternatively, the second configuration may indicate a second set of TCI states associated with the second BWP. In some cases, the first set of TCI states may be associated with uplink communications and the second set of TCI states may be associated with downlink communications. In some cases, the UE 115-*b* may receive a message activating a second BWP part for communications by the UE 115-*b*, and may communicate, via the second BWP, according to at least one TCI state of the first set of TCI states associated with the first BWP based on the second configuration not configuring a set of TCI states for the second BWP.

At 420, the TRP 405-*a* and the TRP 405-*b* may transmit respective activation MAC-CEs to the UE 115-*b*. For example, the TRP 405-*a* may transmit a first MAC-CE including a first CORESET ID of a set of CORESET IDs and activating the first TCI state for the first CORESET ID, where the first CORESET ID may correspond to a first CORESET of a set of CORESETs. Similarly, the TRP 405-*b* may transmit a second MAC-CE including a second CORESET ID of the set of CORESET IDs and activating the second TCI state for the second CORESET ID, where the second CORESET ID may correspond to a second CORESET of the set of CORESETs. In some cases, the first CORESET ID may be associated with the TRP 405-*a* and the second CORESET ID may be associated with the TRP 405-*b*.

At 425, the TRP 405-*a* and the TRP 405-*b* may transmit multiple DCIs to the UE 115-*b* to schedule simultaneous uplink transmissions. For example, the TRP 405-*a* may transmit, via the first CORESET, a first DCI of the multiple DCIs, where the first DCI may schedule a first PUSCH message from the UE 115-*b*, and may transmit, via the second CORESET, a second DCI of the multiple DCIs, where the second DCI may schedule a second PUSCH message from the UE 115-*b*.

At 430, the UE 115-*b* may transmit multiple PUSCH messages scheduled by the multiple DCIs. In some cases, one or more communication parameters associated with the multiple PUSCH messages may be determined from respective reference signal resource sets configured by respective resource set configurations. To support determining the respective reference signal resource sets, the UE 115-*b* may identify a TCI state that is associated with a CORESET ID (e.g., associated with each TRP 405) and is configured for the respective reference signal resource set. For example, the one or more communication parameters for the first PUSCH message (e.g., scheduled by the first DCI) may be determined according to the first resource set and the first CORESET ID (e.g., each associated with the first TCI state) and the one or more communication parameters a second PUSCH message (e.g., scheduled by the second DCI) may be determined according to the second resource set and the second CORESET ID (e.g., each associated with the second TCI state). In some cases, the first resource set may be determined by determining a correspondence between the first TCI state associated with the first CORESET and the TCI state associated with the first resource set (e.g., the first TCI state). In some cases, the second resource set may be determined by determining a correspondence between the second TCI state associated with the second CORESET and the TCI state associated with the second resource set (e.g., the secondTCI state).

Figure 5:
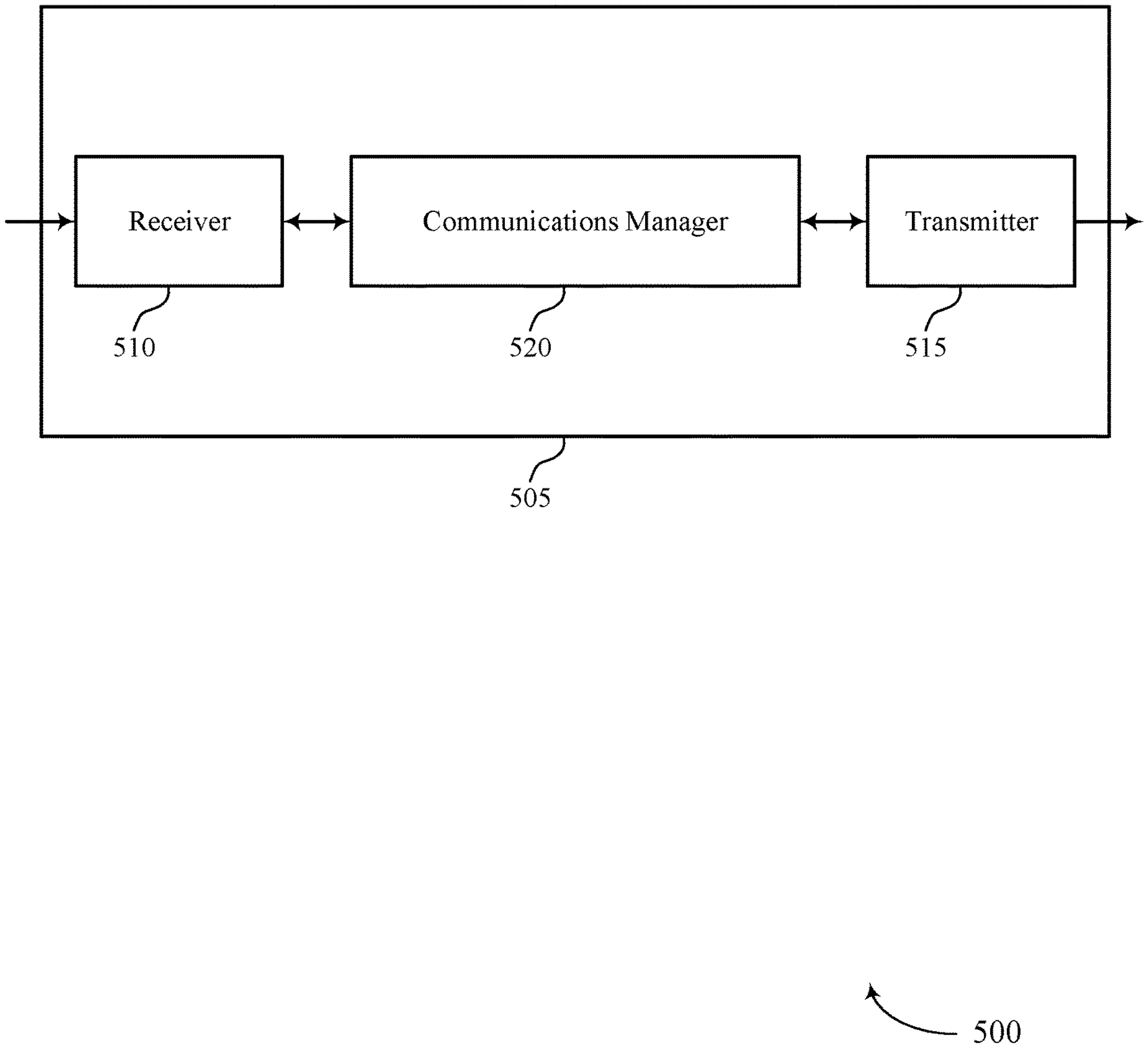
FIGS. 5 and 6 illustrate block diagrams of devices that support configuring uplink transmissions according to transmission configuration indicator state in accordance with one or more aspects of the present disclosure.

FIG. 5 illustrates a block diagram 500 of a device 505 that supports configuring uplink transmissions according to TCI state in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to configuring uplink transmissions according to TCI state). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to configuring uplink transmissions according to TCI state). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of configuring uplink transmissions according to TCI state as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving an indication of a set of multiple resource set configurations, each resource set configuration of the set of multiple resource set configurations corresponding to a respective reference signal resource set of a set of multiple reference signal resource sets. The communications manager 520 may be configured as or otherwise support a means for receiving a set of multiple DCI messages, each DCI message of the set of multiple DCI messages received via a respective CORESET of a set of multiple CORESETs, each CORESET associated with a respective CORESET ID of a set of multiple CORESET IDs. The communications manager 520 may be configured as or otherwise support a means for transmitting a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for configuring uplink transmission according to a TCI state, which may improve configuration flexibility for a network entity.

Figure 6:
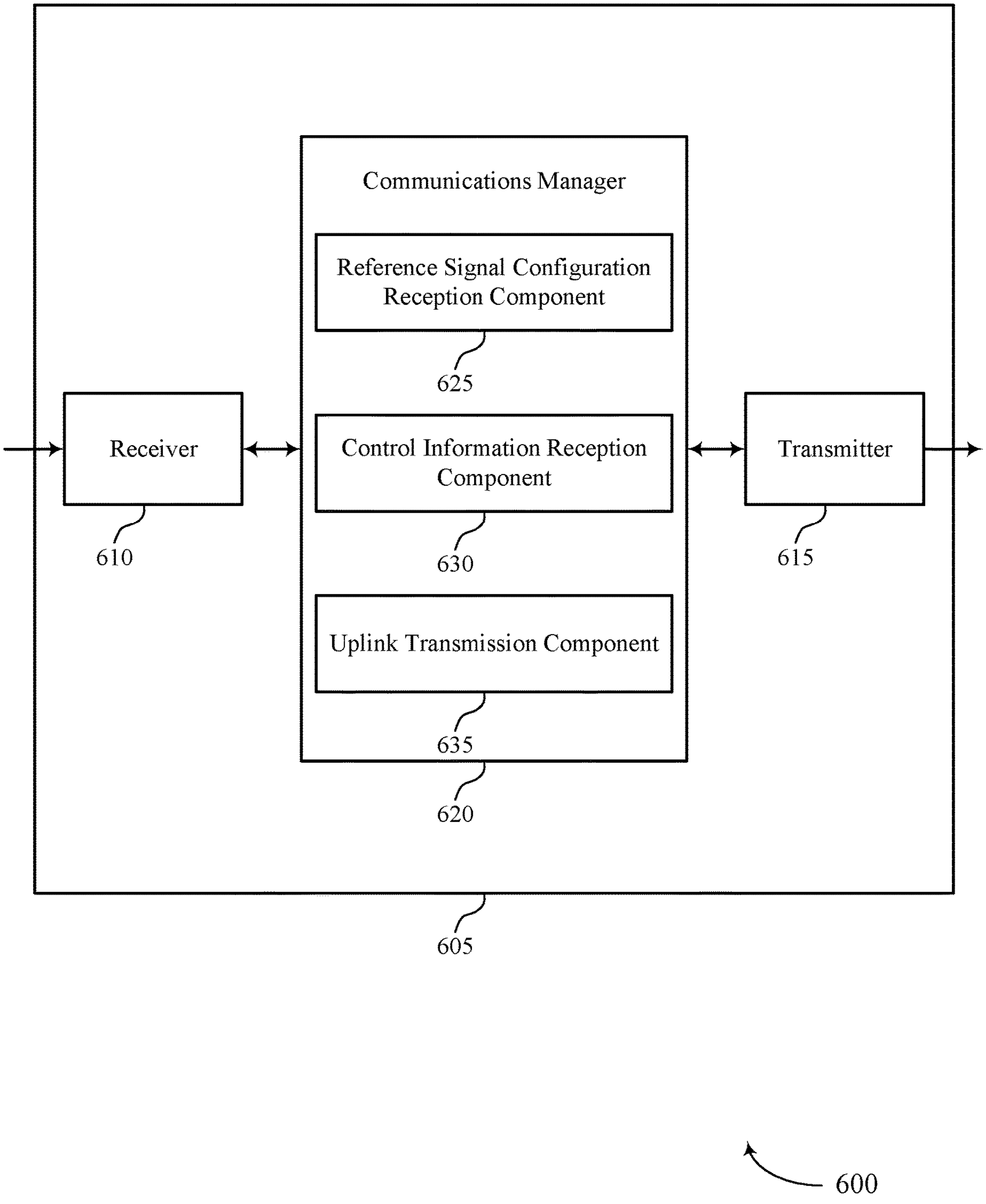

FIG. 6 illustrates a block diagram 600 of a device 605 that supports configuring uplink transmissions according to TCI state in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to configuring uplink transmissions according to TCI state). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to configuring uplink transmissions according to TCI state). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of configuring uplink transmissions according to TCI state as described herein. For example, the communications manager 620 may include a reference signal configuration reception component 625, a control information reception component 630, an uplink transmission component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The reference signal configuration reception component 625 may be configured as or otherwise support a means for receiving an indication of a set of multiple resource set configurations, each resource set configuration of the set of multiple resource set configurations corresponding to a respective reference signal resource set of a set of multiple reference signal resource sets. The control information reception component 630 may be configured as or otherwise support a means for receiving a set of multiple DCI messages, each DCI message of the set of multiple DCI messages received via a respective CORESET of a set of multiple CORESETs, each CORESET associated with a respective CORESET ID of a set of multiple CORESET IDs. The uplink transmission component 635 may be configured as or otherwise support a means for transmitting a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

Figure 7:
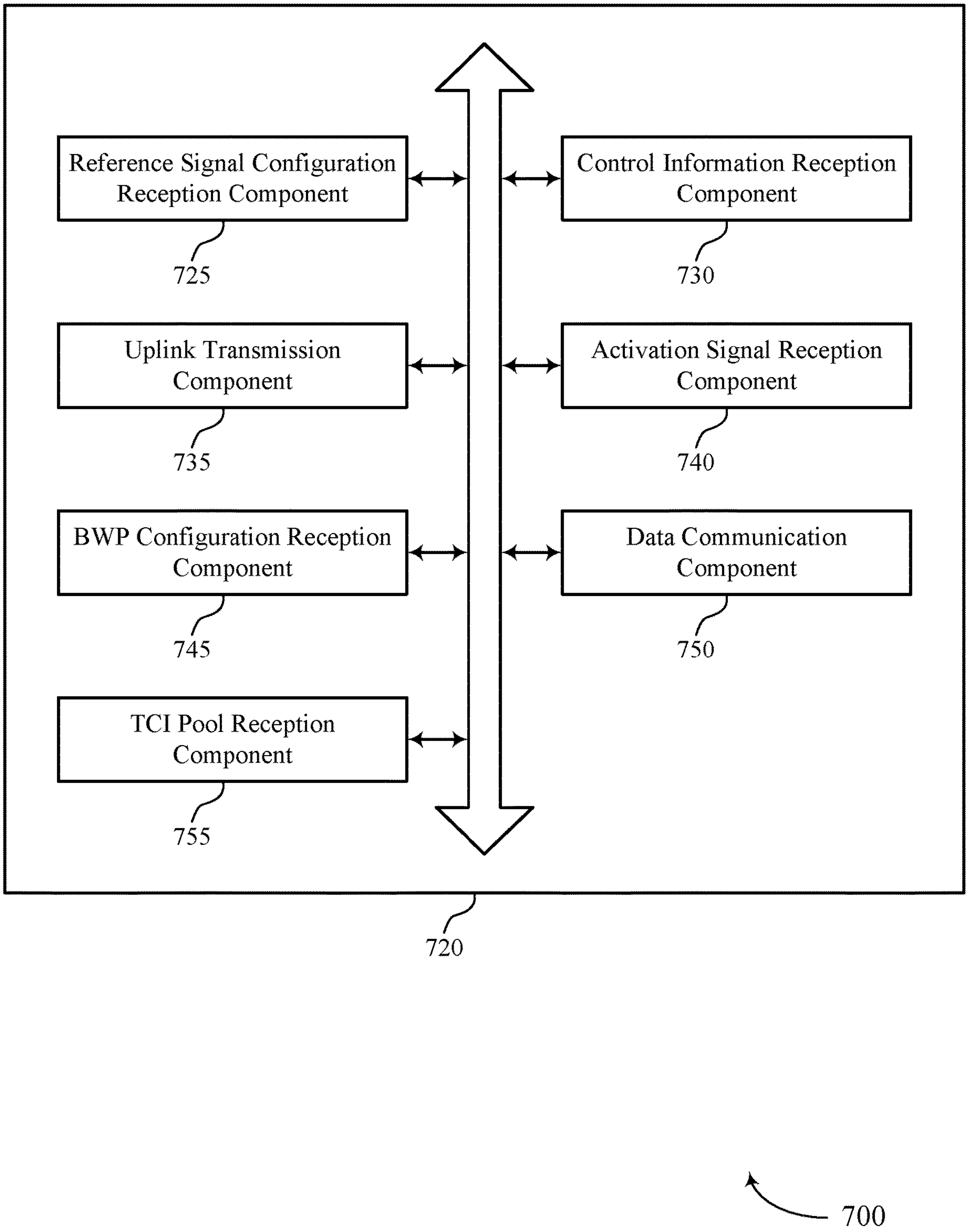
FIG. 7 illustrates a block diagram of a communications manager that supports configuring uplink transmissions according to transmission configuration indicator state in accordance with one or more aspects of the present disclosure.

FIG. 7 illustrates a block diagram 700 of a communications manager 720 that supports configuring uplink transmissions according to TCI state in accordance with one or more aspects of the present disclosure. The communications manager 720 may be an example of aspects of a communications manager 520, a communications manager 620, or both, as described herein. The communications manager 720, or various components thereof, may be an example of means for performing various aspects of configuring uplink transmissions according to TCI state as described herein. For example, the communications manager 720 may include a reference signal configuration reception component 725, a control information reception component 730, an uplink transmission component 735, an activation signal reception component 740, a BWP configuration reception component 745, a data communication component 750, a TCI pool reception component 755, or any combination thereof. Each of these components may communicate, directly or indirectly, with one another (e.g., via one or more buses).

The communications manager 720 may support wireless communication at a UE in accordance with examples as disclosed herein. The reference signal configuration reception component 725 may be configured as or otherwise support a means for receiving an indication of a set of multiple resource set configurations, each resource set configuration of the set of multiple resource set configurations corresponding to a respective reference signal resource set of a set of multiple reference signal resource sets. The control information reception component 730 may be configured as or otherwise support a means for receiving a set of multiple DCI messages, each DCI message of the set of multiple DCI messages received via a respective CORESET of a set of multiple CORESETs, each CORESET associated with a respective CORESET ID of a set of multiple CORESET IDs. The uplink transmission component 735 may be configured as or otherwise support a means for transmitting a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

In some examples, the activation signal reception component 740 may be configured as or otherwise support a means for receiving, from a first TRP configured for the UE, a first message including a first CORESET ID of the set of multiple CORESET IDs and activating a first TCI state for the first CORESET ID, the first CORESET ID corresponding to a first CORESET of the set of multiple CORESETs. In some examples, the activation signal reception component 740 may be configured as or otherwise support a means for receiving, from a second TRP configured for the UE, a second message including a second CORESET ID of the set of multiple CORESET IDs and activating a second TCI state for the second CORESET ID, the second CORESET ID corresponding to a second CORESET of the set of multiple CORESETs.

In some examples, to support receiving the set of multiple DCI messages, the control information reception component 730 may be configured as or otherwise support a means for receiving, via the first CORESET and from the first TRP, a first DCI message of the set of multiple DCI messages, where the first DCI message schedules a first PUSCH message of the set of multiple PUSCH messages. In some examples, to support receiving the set of multiple DCI messages, the control information reception component 730 may be configured as or otherwise support a means for receiving, via the second CORESET and from the second TRP, a second DCI message of the set of multiple DCI messages, where the second DCI message schedules a second PUSCH message of the set of multiple PUSCH messages.

In some examples, the first TCI state is associated with the first CORESET ID and is configured for a first reference signal resource set of the set of multiple reference signal resource sets by a first resource set configuration of the set of multiple resource set configurations; and the second TCI state is associated with the second CORESET ID and is configured for a second reference signal resource set of the set of multiple reference signal resource sets by a second reference signal resource set configuration of the set of multiple resource set configurations.

In some examples, to support transmitting the set of multiple PUSCH messages, the uplink transmission component 735 may be configured as or otherwise support a means for transmitting the first PUSCH message, where the one or more communication parameters associated with the first PUSCH message are based on the first reference signal resource set. In some examples, to support transmitting the set of multiple PUSCH messages, the uplink transmission component 735 may be configured as or otherwise support a means for transmitting the second PUSCH message, where the one or more communication parameters associated with the second PUSCH message are based on the second reference signal resource set.

In some examples, the BWP configuration reception component 745 may be configured as or otherwise support a means for receiving a first configuration associated with a first BWP, the first configuration indicating a set of TCI states associated with the first BWP. In some examples, the activation signal reception component 740 may be configured as or otherwise support a means for receiving a message activating a second BWP for communications by the UE. In some examples, the data communication component 750 may be configured as or otherwise support a means for communicating, via the second BWP, according to at least one TCI state of the set of TCI states associated with the first BWP.

In some examples, the BWP configuration reception component 745 may be configured as or otherwise support a means for receiving a second configuration associated with the second BWP, where communicating according to the at least one TCI state is based on the second configuration indicating the first BWP.

In some examples, the TCI pool reception component 755 may be configured as or otherwise support a means for receiving a second set of TCI states associated with the second BWP, where: the set of TCI states are associated with uplink communications and the second set of TCI states are associated with downlink communications; or the set of TCI states are associated with downlink communications and the second set of TCI states are associated with uplink communications.

Figure 8:
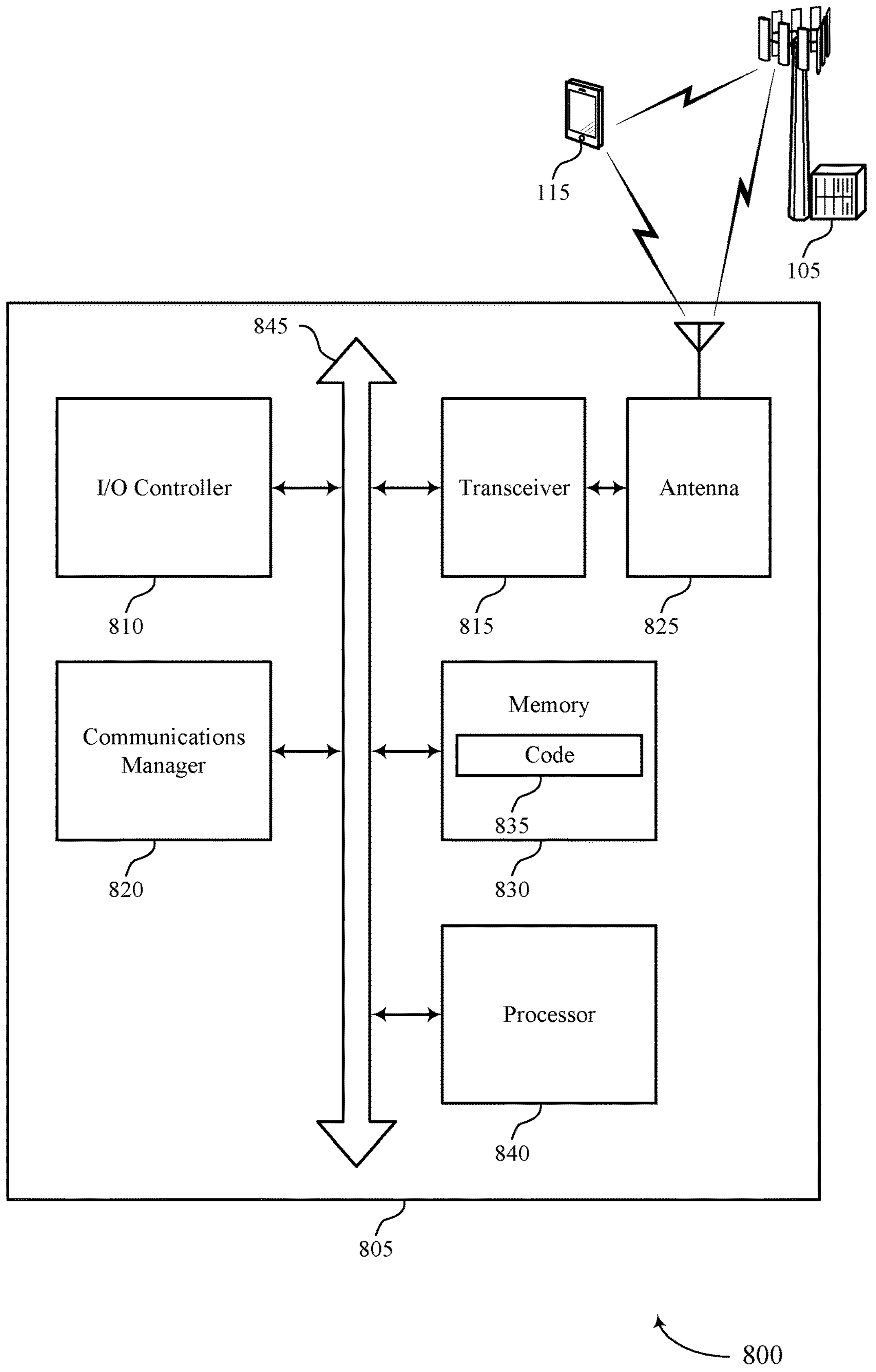
FIG. 8 illustrates a diagram of a system including a device that supports configuring uplink transmissions according to transmission configuration indicator state in accordance with one or more aspects of the present disclosure.

FIG. 8 illustrates a diagram of a system 800 including a device 805 that supports configuring uplink transmissions according to TCI state in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting configuring uplink transmissions according to TCI state). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving an indication of a set of multiple resource set configurations, each resource set configuration of the set of multiple resource set configurations corresponding to a respective reference signal resource set of a set of multiple reference signal resource sets. The communications manager 820 may be configured as or otherwise support a means for receiving a set of multiple DCI messages, each DCI message of the set of multiple DCI messages received via a respective CORESET of a set of multiple CORESETs, each CORESET associated with a respective CORESET ID of a set of multiple CORESET IDs. The communications manager 820 may be configured as or otherwise support a means for transmitting a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

By including or configuring the communications manager 820 in accordance with examples as described herein, the device 805 may support techniques for configuring uplink transmission according to a TCI state, which may improve configuration flexibility for a network entity.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of configuring uplink transmissions according to TCI state as described herein, or the processor 840 and the memory 830 may be otherwise configured to perform or support such operations.

Figure 9:
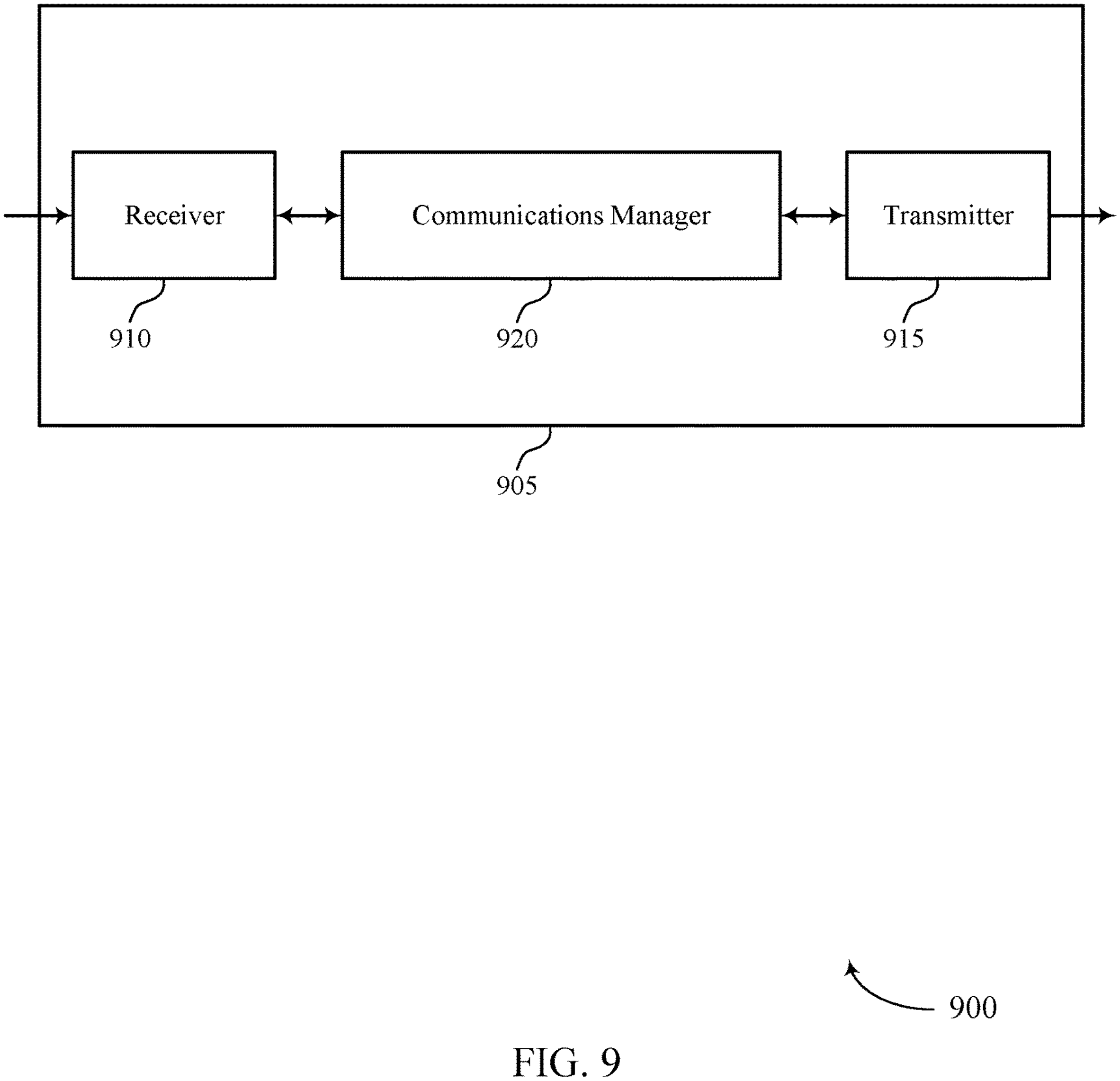
FIGS. 9 and 10 illustrate block diagrams of devices that support configuring uplink transmissions according to transmission configuration indicator state in accordance with one or more aspects of the present disclosure.

FIG. 9 illustrates a block diagram 900 of a device 905 that supports configuring uplink transmissions according to TCI state in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of configuring uplink transmissions according to TCI state as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting, to a UE configured with a set of multiple TRPs, an indication of a set of multiple resource set configurations, each resource set configuration of the set of multiple resource set configurations corresponding to a respective reference signal resource set of a set of multiple reference signal resource sets. The communications manager 920 may be configured as or otherwise support a means for transmitting, via the set of multiple TRPs, a set of multiple DCI messages, each DCI message of the set of multiple DCI messages transmitted via a respective CORESET of a set of multiple CORESETs, each CORESET associated with a respective CORESET ID of a set of multiple CORESET IDs. The communications manager 920 may be configured as or otherwise support a means for receiving, via the set of multiple TRPs, a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for configuring uplink transmission according to a TCI state, which may improve configuration flexibility for a network entity.

Figure 10:
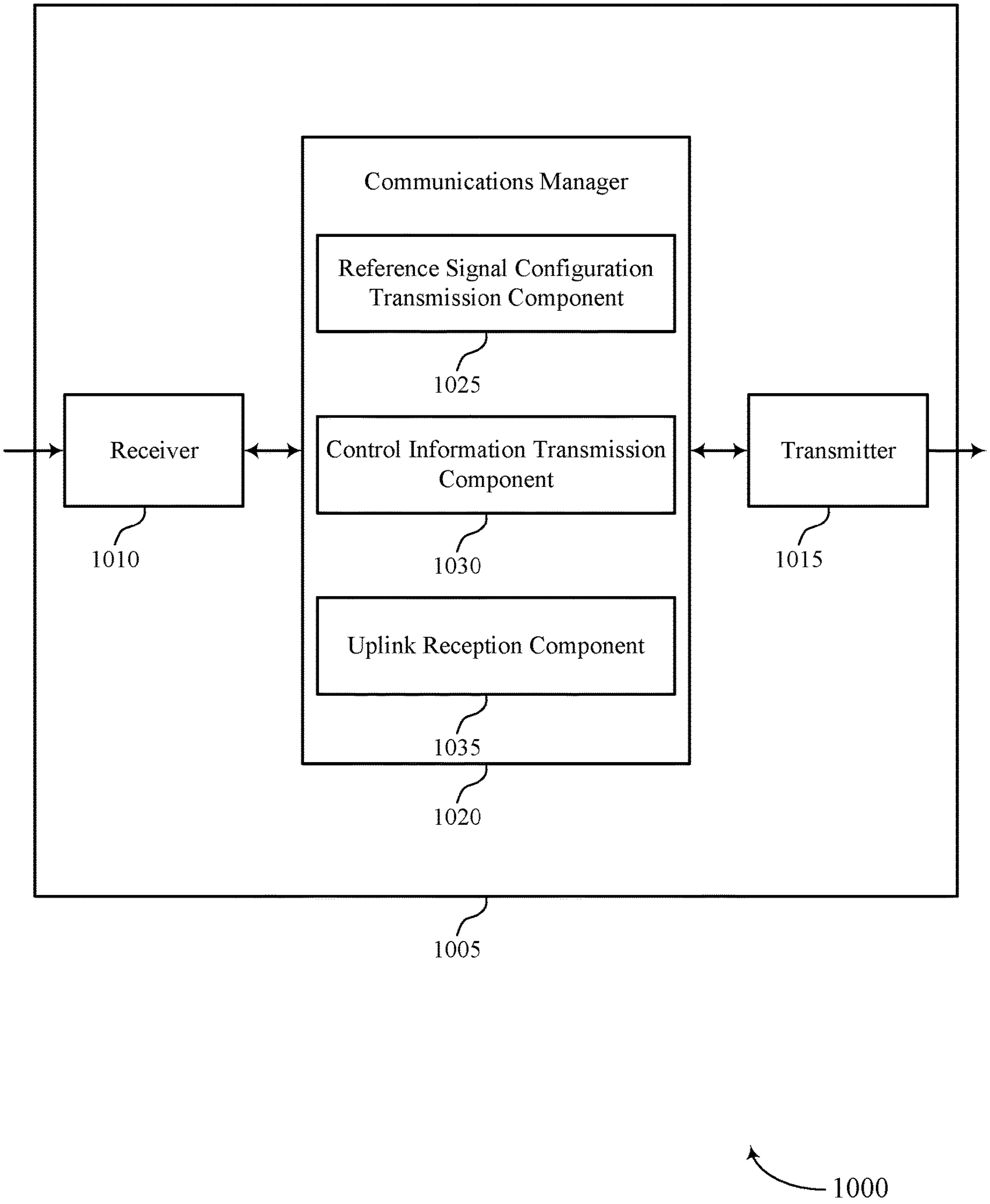

FIG. 10 illustrates a block diagram 1000 of a device 1005 that supports configuring uplink transmissions according to TCI state in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of configuring uplink transmissions according to TCI state as described herein. For example, the communications manager 1020 may include a reference signal configuration transmission component 1025, a control information transmission component 1030, an uplink reception component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The reference signal configuration transmission component 1025 may be configured as or otherwise support a means for transmitting, to a UE configured with a set of multiple TRPs, an indication of a set of multiple resource set configurations, each resource set configuration of the set of multiple resource set configurations corresponding to a respective reference signal resource set of a set of multiple reference signal resource sets. The control information transmission component 1030 may be configured as or otherwise support a means for transmitting, via the set of multiple TRPs, a set of multiple DCI messages, each DCI message of the set of multiple DCI messages transmitted via a respective CORESET of a set of multiple CORESETs, each CORESET associated with a respective CORESET ID of a set of multiple CORESET IDs. The uplink reception component 1035 may be configured as or otherwise support a means for receiving, via the set of multiple TRPs, a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

Figure 11:
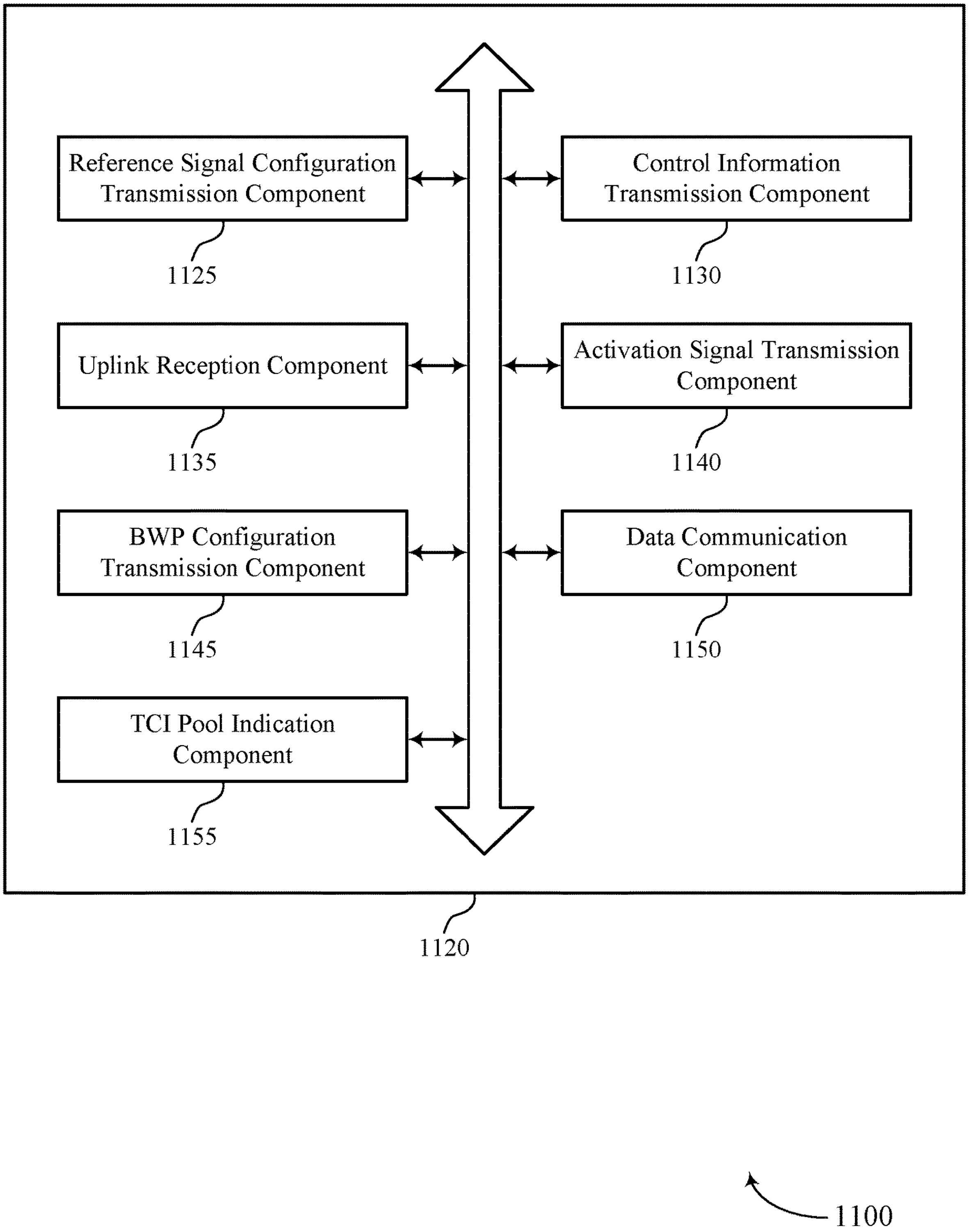
FIG. 11 illustrates a block diagram of a communications manager that supports configuring uplink transmissions according to transmission configuration indicator state in accordance with one or more aspects of the present disclosure.

FIG. 11 illustrates a block diagram 1100 of a communications manager 1120 that supports configuring uplink transmissions according to TCI state in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of configuring uplink transmissions according to TCI state as described herein. For example, the communications manager 1120 may include a reference signal configuration transmission component 1125, a control information transmission component 1130, an uplink reception component 1135, an activation signal transmission component 1140, a BWP configuration transmission component 1145, a data communication component 1150, a TCI pool indication component 1155, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The reference signal configuration transmission component 1125 may be configured as or otherwise support a means for transmitting, to a UE configured with a set of multiple TRPs, an indication of a set of multiple resource set configurations, each resource set configuration of the set of multiple resource set configurations corresponding to a respective reference signal resource set of a set of multiple reference signal resource sets. The control information transmission component 1130 may be configured as or otherwise support a means for transmitting, via the set of multiple TRPs, a set of multiple DCI messages, each DCI message of the set of multiple DCI messages transmitted via a respective CORESET of a set of multiple CORESETs, each CORESET associated with a respective CORESET ID of a set of multiple CORESET IDs. The uplink reception component 1135 may be configured as or otherwise support a means for receiving, via the set of multiple TRPs, a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

In some examples, the activation signal transmission component 1140 may be configured as or otherwise support a means for transmitting, via a first TRP of the set of multiple TRPs, a first message including a first CORESET ID of the set of multiple CORESET IDs and activating a first TCI state for the first CORESET ID, the first CORESET ID corresponding to a first CORESET of the set of multiple CORESETs. In some examples, the activation signal transmission component 1140 may be configured as or otherwise support a means for transmitting, via a second TRP of the set of multiple TRPs, a second message including a second CORESET ID of the set of multiple CORESET IDs and activating a second TCI state for the second CORESET ID, the second CORESET ID corresponding to a second CORESET of the set of multiple CORESETs.

In some examples, to support transmitting the set of multiple DCI messages, the control information transmission component 1130 may be configured as or otherwise support a means for transmitting, via the first TRP in the first CORESET, a first DCI message of the set of multiple DCI messages, where the first DCI message schedules a first PUSCH message of the set of multiple PUSCH messages. In some examples, to support transmitting the set of multiple DCI messages, the control information transmission component 1130 may be configured as or otherwise support a means for transmitting, via the second TRP in the second CORESET, a second DCI message of the set of multiple DCI messages, where the second DCI message schedules a second PUSCH message of the set of multiple PUSCH messages.

In some examples, the first TCI state is associated with the first CORESET ID and is configured for a first reference signal resource set of the set of multiple reference signal resource sets by a first resource set configuration of the set of multiple resource set configurations; and the second TCI state is associated with the second CORESET ID and is configured for a second reference signal resource set of the set of multiple reference signal resource sets by a second reference signal resource set configuration of the set of multiple resource set configurations.

In some examples, to support receiving the set of multiple PUSCH messages, the uplink reception component 1135 may be configured as or otherwise support a means for receiving the first PUSCH message, where the one or more communication parameters associated with the first PUSCH message are based on the first reference signal resource set. In some examples, to support receiving the set of multiple PUSCH messages, the uplink reception component 1135 may be configured as or otherwise support a means for receiving the second PUSCH message, where the one or more communication parameters associated with the second PUSCH message are based on the second reference signal resource set.

In some examples, the BWP configuration transmission component 1145 may be configured as or otherwise support a means for transmitting a first configuration associated with a first BWP, the first configuration indicating a set of TCI states associated with the first BWP. In some examples, the activation signal transmission component 1140 may be configured as or otherwise support a means for transmitting a message activating a second BWP for communications by the UE. In some examples, the data communication component 1150 may be configured as or otherwise support a means for communicating, via the second BWP, according to at least one TCI state of the set of TCI states associated with the first BWP.

In some examples, the BWP configuration transmission component 1145 may be configured as or otherwise support a means for transmitting a second configuration associated with the second BWP, where communicating according to the at least one TCI state is based on the second configuration indicating the first BWP.

In some examples, the TCI pool indication component 1155 may be configured as or otherwise support a means for transmitting, to the UE, a second set of TCI states associated with the second BWP, where: the set of TCI states are associated with uplink communications and the second set of TCI states are associated with downlink communications; or the set of TCI states are associated with downlink communications and the second set of TCI states are associated with uplink communications.

Figure 12:
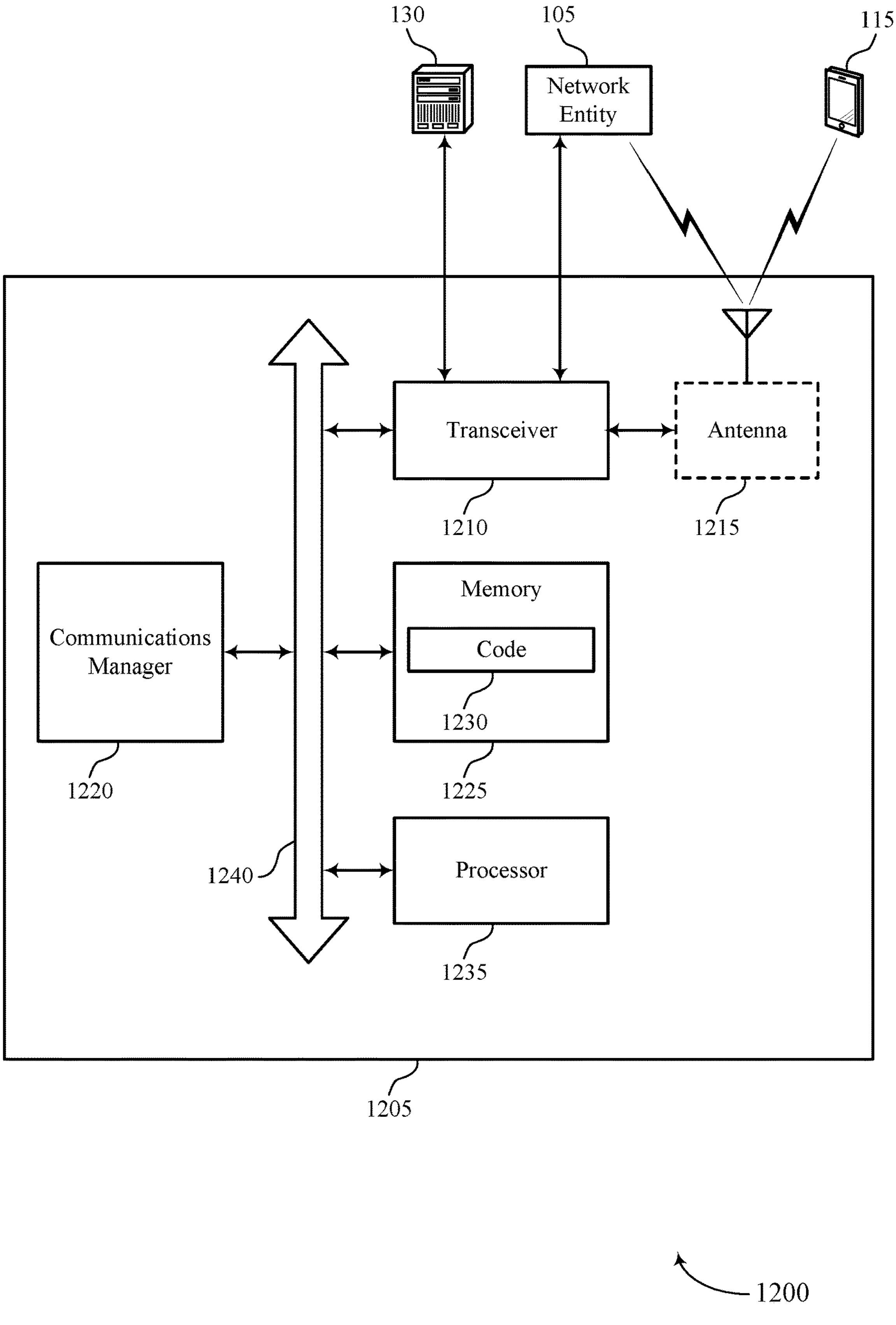
FIG. 12 illustrates a diagram of a system including a device that supports configuring uplink transmissions according to transmission configuration indicator state in accordance with one or more aspects of the present disclosure.

FIG. 12 illustrates a diagram of a system 1200 including a device 1205 that supports configuring uplink transmissions according to TCI state in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting configuring uplink transmissions according to TCI state). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting, to a UE configured with a set of multiple TRPs, an indication of a set of multiple resource set configurations, each resource set configuration of the set of multiple resource set configurations corresponding to a respective reference signal resource set of a set of multiple reference signal resource sets. The communications manager 1220 may be configured as or otherwise support a means for transmitting, via the set of multiple TRPs, a set of multiple DCI messages, each DCI message of the set of multiple DCI messages transmitted via a respective CORESET of a set of multiple CORESETs, each CORESET associated with a respective CORESET ID of a set of multiple CORESET IDs. The communications manager 1220 may be configured as or otherwise support a means for receiving, via the set of multiple TRPs, a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets.

By including or configuring the communications manager 1220 in accordance with examples as described herein, the device 1205 may support techniques for configuring uplink transmission according to a TCI state, which may improve configuration flexibility for a network entity.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of configuring uplink transmissions according to TCI state as described herein, or the processor 1235 and the memory 1225 may be otherwise configured to perform or support such operations.

Figure 13:
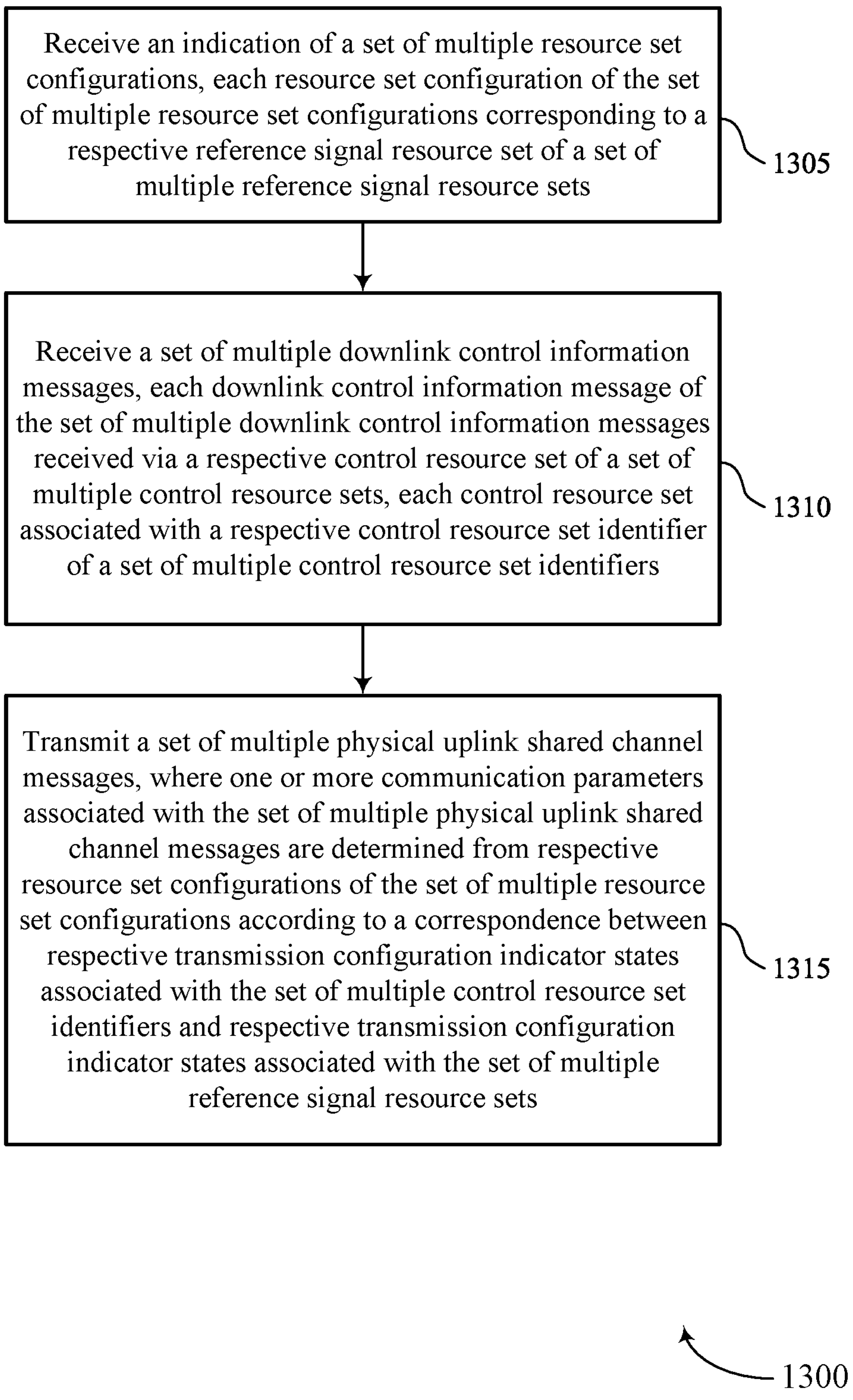
FIGS. 13 and 14 illustrate flowcharts showing methods that support configuring uplink transmissions according to transmission configuration indicator state in accordance with one or more aspects of the present disclosure.

FIG. 13 illustrates a flowchart showing a method 1300 that supports configuring uplink transmissions according to TCI state in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving an indication of a set of multiple resource set configurations, each resource set configuration of the set of multiple resource set configurations corresponding to a respective reference signal resource set of a set of multiple reference signal resource sets. The operations of 1305 may be performed in accordance with examples as disclosed herein. In some examples, aspects of the operations of 1305 may be performed by a reference signal configuration reception component 725 as described with reference to FIG. 7.

At 1310, the method may include receiving a set of multiple DCI messages, each DCI message of the set of multiple DCI messages received via a respective CORESET of a set of multiple CORESETs, each CORESET associated with a respective CORESET ID of a set of multiple CORESET IDs. The operations of 1310 may be performed in accordance with examples as disclosed herein. In some examples, aspects of the operations of 1310 may be performed by a control information reception component 730 as described with reference to FIG. 7.

At 1315, the method may include transmitting a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets. The operations of 1315 may be performed in accordance with examples as disclosed herein. In some examples, aspects of the operations of 1315 may be performed by an uplink transmission component 735 as described with reference to FIG. 7.

Figure 14:
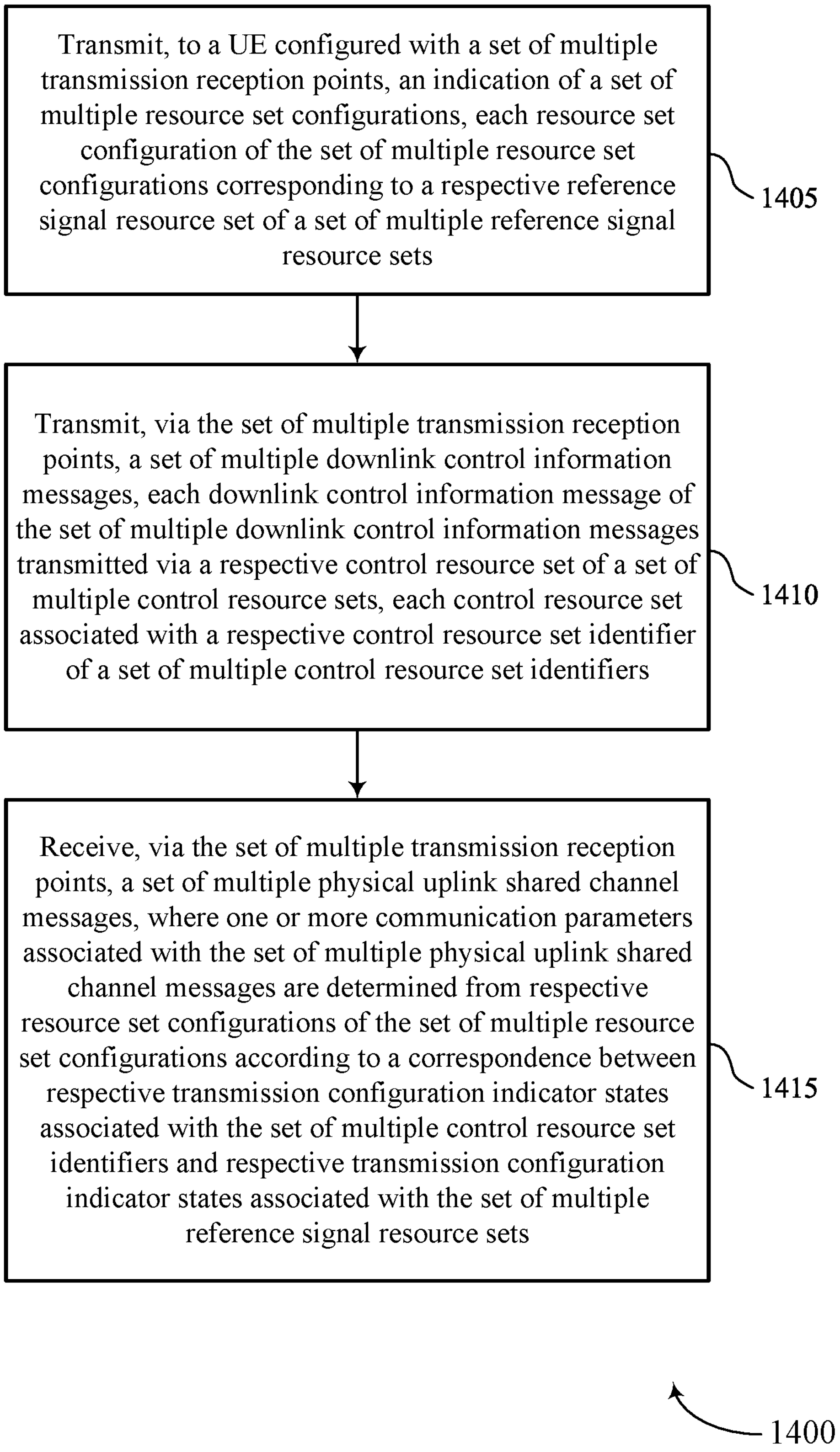

FIG. 14 illustrates a flowchart showing a method 1400 that supports configuring uplink transmissions according to TCI state in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting, to a UE configured with a set of multiple TRPs, an indication of a set of multiple resource set configurations, each resource set configuration of the set of multiple resource set configurations corresponding to a respective reference signal resource set of a set of multiple reference signal resource sets. The operations of 1405 may be performed in accordance with examples as disclosed herein. In some examples, aspects of the operations of 1405 may be performed by a reference signal configuration transmission component 1125 as described with reference to FIG. 11.

At 1410, the method may include transmitting, via the set of multiple TRPs, a set of multiple DCI messages, each DCI message of the set of multiple DCI messages transmitted via a respective CORESET of a set of multiple CORESETs, each CORESET associated with a respective CORESET ID of a set of multiple CORESET IDs. The operations of 1410 may be performed in accordance with examples as disclosed herein. In some examples, aspects of the operations of 1410 may be performed by a control information transmission component 1130 as described with reference to FIG. 11.

At 1415, the method may include receiving, via the set of multiple TRPs, a set of multiple PUSCH messages, where one or more communication parameters associated with the set of multiple PUSCH messages are determined from respective resource set configurations of the set of multiple resource set configurations according to a correspondence between respective TCI states associated with the set of multiple CORESET IDs and respective TCI states associated with the set of multiple reference signal resource sets. The operations of 1415 may be performed in accordance with examples as disclosed herein. In some examples, aspects of the operations of 1415 may be performed by an uplink reception component 1135 as described with reference to FIG. 11.

The following provides an overview of aspects of the present disclosure:

Aspect 1: A method for wireless communication at a UE, comprising: receiving an indication of a plurality of resource set configurations, each resource set configuration of the plurality of resource set configurations corresponding to a respective reference signal resource set of a plurality of reference signal resource sets; receiving a plurality of DCI messages, each DCI message of the plurality of DCI messages received via a respective CORESET of a plurality of CORESETs, each CORESET associated with a respective CORESET ID of a plurality of CORESET IDs; and transmitting a plurality of PUSCH messages, wherein one or more communication parameters associated with the plurality of PUSCH messages are determined from respective resource set configurations of the plurality of resource set configurations according to a correspondence between respective TCI states associated with the plurality of CORESET IDs and respective TCI states associated with the plurality of reference signal resource sets.

Aspect 2: The method of aspect 1, further comprising: receiving, from a first TRP configured for the UE, a first message comprising a first CORESET ID of the plurality of CORESET IDs and activating a first TCI state for the first CORESET ID, the first CORESET ID corresponding to a first CORESET of the plurality of CORESETs; and receiving, from a second TRP configured for the UE, a second message comprising a second CORESET ID of the plurality of CORESET IDs and activating a second TCI state for the second CORESET ID, the second CORESET ID corresponding to a second CORESET of the plurality of CORESETs.

Aspect 3: The method of aspect 2, wherein receiving the plurality of DCI messages comprises: receiving, via the first CORESET and from the first TRP, a first DCI message of the plurality of DCI messages, wherein the first DCI message schedules a first PUSCH message of the plurality of PUSCH messages; and receiving, via the second CORESET and from the second TRP, a second DCI message of the plurality of DCI messages, wherein the second DCI message schedules a second PUSCH message of the plurality of PUSCH messages.

Aspect 4: The method of aspect 3, wherein the first TCI state is associated with the first CORESET ID and is configured for a first reference signal resource set of the plurality of reference signal resource sets by a first resource set configuration of the plurality of resource set configurations; and the second TCI state is associated with the second CORESET ID and is configured for a second reference signal resource set of the plurality of reference signal resource sets by a second reference signal resource set configuration of the plurality of resource set configurations.

Aspect 5: The method of aspect 4, wherein transmitting the plurality of PUSCH messages comprises: transmitting the first PUSCH message, wherein the one or more communication parameters associated with the first PUSCH message are based at least in part on the first reference signal resource set; and transmitting the second PUSCH message, wherein the one or more communication parameters associated with the second PUSCH message are based at least in part on the second reference signal resource set.

Aspect 6: The method of any of aspects 1 through 5, further comprising: receiving a first configuration associated with a first BWP, the first configuration indicating a set of TCI states associated with the first BWP; receiving a message activating a second BWP for communications by the UE; and communicating, via the second BWP, according to at least one TCI state of the set of TCI states associated with the first BWP.

Aspect 7: The method of aspect 6, further comprising: receiving a second configuration associated with the second BWP, wherein communicating according to the at least one TCI state is based at least in part on the second configuration indicating the first BWP.

Aspect 8: The method of any of aspects 6 through 7, further comprising: receiving a second set of TCI states associated with the second BWP, wherein: the set of TCI states are associated with uplink communications and the second set of TCI states are associated with downlink communications; or the set of TCI states are associated with downlink communications and the second set of TCI states are associated with uplink communications.

Aspect 9: A method for wireless communication at a network entity, comprising: transmitting, to a UE configured with a plurality of TRPs, an indication of a plurality of resource set configurations, each resource set configuration of the plurality of resource set configurations corresponding to a respective reference signal resource set of a plurality of reference signal resource sets; transmitting, via the plurality of TRPs, a plurality of DCI messages, each DCI message of the plurality of DCI messages transmitted via a respective CORESET of a plurality of CORESETs, each CORESET associated with a respective CORESET ID of a plurality of CORESET IDs; and receiving, via the plurality of TRPs, a plurality of PUSCH messages, wherein one or more communication parameters associated with the plurality of PUSCH messages are determined from respective resource set configurations of the plurality of resource set configurations according to a correspondence between respective TCI states associated with the plurality of CORESET IDs and respective TCI states associated with the plurality of reference signal resource sets.

Aspect 10: The method of aspect 9, further comprising: transmitting, via a first TRP of the plurality of TRPs, a first message comprising a first CORESET ID of the plurality of CORESET IDs and activating a first TCI state for the first CORESET ID, the first CORESET ID corresponding to a first CORESET of the plurality of CORESETs; and transmitting, via a second TRP of the plurality of TRPs, a second message comprising a second CORESET ID of the plurality of CORESET IDs and activating a second TCI state for the second CORESET ID, the second CORESET ID corresponding to a second CORESET of the plurality of CORESETs.

Aspect 11: The method of aspect 10, wherein transmitting the plurality of DCI messages comprises: transmitting, via the first TRP in the first CORESET, a first DCI message of the plurality of DCI messages, wherein the first DCI message schedules a first PUSCH message of the plurality of PUSCH messages; and transmitting, via the second TRP in the second CORESET, a second DCI message of the plurality of DCI messages, wherein the second DCI message schedules a second PUSCH message of the plurality of PUSCH messages.

Aspect 12: The method of aspect 11, wherein the first TCI state is associated with the first CORESET ID and is configured for a first reference signal resource set of the plurality of reference signal resource sets by a first resource set configuration of the plurality of resource set configurations; and the second TCI state is associated with the second CORESET ID and is configured for a second reference signal resource set of the plurality of reference signal resource sets by a second reference signal resource set configuration of the plurality of resource set configurations.

Aspect 13: The method of aspect 12, wherein receiving the plurality of PUSCH messages comprises: receiving the first PUSCH message, wherein the one or more communication parameters associated with the first PUSCH message are based at least in part on the first reference signal resource set; and receiving the second PUSCH message, wherein the one or more communication parameters associated with the second PUSCH message are based at least in part on the second reference signal resource set.

Aspect 14: The method of any of aspects 9 through 13, further comprising: transmitting a first configuration associated with a first BWP, the first configuration indicating a set of TCI states associated with the first BWP; transmitting a message activating a second BWP for communications by the UE; and communicating, via the second BWP, according to at least one TCI state of the set of TCI states associated with the first BWP.

Aspect 15: The method of aspect 14, further comprising: transmitting a second configuration associated with the second BWP, wherein communicating according to the at least one TCI state is based at least in part on the second configuration indicating the first BWP.

Aspect 16: The method of any of aspects 14 through 15, further comprising: transmitting, to the UE, a second set of TCI states associated with the second BWP, wherein: the set of TCI states are associated with uplink communications and the second set of TCI states are associated with downlink communications; or the set of TCI states are associated with downlink communications and the second set of TCI states are associated with uplink communications.

Aspect 17: An apparatus for wireless communication at a UE, comprising a processor; memory coupled with the processor; and instructions stored in the memory and executable by the processor to cause the apparatus to perform a method of any of aspects 1 through 8.

Aspect 18: An apparatus for wireless communication at a UE, comprising at least one means for performing a method of any of aspects 1 through 8.

Aspect 19: A non-transitory computer-readable medium storing code for wireless communication at a UE, the code comprising instructions executable by a processor to perform a method of any of aspects 1 through 8.

Aspect 20: An apparatus for wireless communication at a network entity, comprising a processor; memory coupled with the processor; and instructions stored in the memory and executable by the processor to cause the apparatus to perform a method of any of aspects 9 through 16.

Aspect 21: An apparatus for wireless communication at a network entity, comprising at least one means for performing a method of any of aspects 9 through 16.

Aspect 22: A non-transitory computer-readable medium storing code for wireless communication at a network entity, the code comprising instructions executable by a processor to perform a method of any of aspects 9 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD)ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

at least one processor;

at least one memory coupled with the at least one processor; and instructions stored in the at least one memory and executable by the at least one processor to cause the UE to:

receive an indication of a plurality of resource set configurations, each resource set configuration of the plurality of resource set configurations corresponding to a respective reference signal resource set of a plurality of reference signal resource sets and configuring a respective transmission configuration indicator state for the respective reference signal resource set;

receive a plurality of downlink control information messages, each downlink control information message of the plurality of downlink control information messages received via a respective control resource set of a plurality of control resource sets, each control resource set associated with a respective control resource set identifier of a plurality of control resource set identifiers; and transmit a plurality of physical uplink shared channel messages, wherein, for each physical uplink shared channel message of the plurality of physical uplink shared channel messages, one or more respective communication parameters are determined through a correspondence between a respective transmission configuration indicator state associated with the respective control resource set identifier of the respective control resource set comprising the downlink control information message that schedules the uplink shared channel message and one of the respective transmission configuration indicator states configured for the plurality of reference signal resource sets, the one or more respective communication parameters being determined from the respective resource set configuration of the plurality of resource set configurations corresponding to the one of the respective transmission configuration indicator states.

2. The UE of claim 1, wherein the instructions are further executable by the at least one processor to cause the UE to:
receive, from a first transmission reception point configured for the UE, a first message comprising a first control resource set identifier of the plurality of control resource set identifiers and activating a first transmission configuration indicator state for the first control resource set identifier, the first control resource set identifier corresponding to a first control resource set of the plurality of control resource sets; and
receive, from a second transmission reception point configured for the UE, a second message comprising a second control resource set identifier of the plurality of control resource set identifiers and activating a second transmission configuration indicator state for the second control resource set identifier, the second control resource set identifier corresponding to a second control resource set of the plurality of control resource sets.

3. The UE of claim 2, wherein the instructions to receive the plurality of downlink control information messages are executable by the at least one processor to cause the UE to:
receive, via the first control resource set and from the first transmission reception point, a first downlink control information message of the plurality of downlink control information messages, wherein the first downlink control information message schedules a first physical uplink shared channel message of the plurality of physical uplink shared channel messages; and
receive, via the second control resource set and from the second transmission reception point, a second downlink control information message of the plurality of downlink control information messages, wherein the second downlink control information message schedules a second physical uplink shared channel message of the plurality of physical uplink shared channel messages.

4. The UE of claim 3, wherein:
the first transmission configuration indicator state is associated with the first control resource set identifier and is configured for a first reference signal resource set of the plurality of reference signal resource sets by a first resource set configuration of the plurality of resource set configurations; and
the second transmission configuration indicator state is associated with the second control resource set identifier and is configured for a second reference signal resource set of the plurality of reference signal resource sets by a second reference signal resource set configuration of the plurality of resource set configurations.

5. The UE of claim 4, wherein the instructions to transmit the plurality of physical uplink shared channel messages are executable by the at least one processor to cause the UE to:
transmit the first physical uplink shared channel message, wherein the one or more communication parameters associated with the first physical uplink shared channel message are based at least in part on the first reference signal resource set; and
transmit the second physical uplink shared channel message, wherein the one or more communication parameters associated with the second physical uplink shared channel message are based at least in part on the second reference signal resource set.

6. The UE of claim 1, wherein the instructions are further executable by the at least one processor to cause the UE to:
receive a first configuration associated with a first bandwidth part, the first configuration indicating a set of transmission configuration indicator states associated with the first bandwidth part;
receive a message activating a second bandwidth part for communications by the UE; and
communicate, via the second bandwidth part, according to at least one transmission configuration indicator state of the set of transmission configuration indicator states associated with the first bandwidth part.

7. The UE of claim 6, wherein the instructions are further executable by the at least one processor to cause the UE to:
receive a second configuration associated with the second bandwidth part, wherein communicating according to the at least one transmission configuration indicator state is based at least in part on the second configuration indicating the first bandwidth part.

8. The UE of claim 6, wherein the instructions are further executable by the at least one processor to cause the UE to:
receive a second set of transmission configuration indicator states associated with the second bandwidth part, wherein:
the set of transmission configuration indicator states are associated with uplink communications and the second set of transmission configuration indicator states are associated with downlink communications; or
the set of transmission configuration indicator states are associated with downlink communications and the second set of transmission configuration indicator states are associated with uplink communications.

9. A network entity for wireless communication, comprising:
at least one processor;
at least one memory coupled with the at least one processor; and
instructions stored in the at least one memory and executable by the at least one processor to cause the network entity to:
transmit, to a user equipment (UE) configured with a plurality of transmission reception points, an indication of a plurality of resource set configurations, each resource set configuration of the plurality of resource set configurations corresponding to a respective reference signal resource set of a plurality of reference signal resource sets and configuring a respective transmission configuration indicator state for the respective reference signal resource set;
transmit, via the plurality of transmission reception points, a plurality of downlink control information messages, each downlink control information message of the plurality of downlink control information messages transmitted via a respective control resource set of a plurality of control resource sets, each control resource set associated with a respective control resource set identifier of a plurality of control resource set identifiers; and
receive, via the plurality of transmission reception points, a plurality of physical uplink shared channel messages, wherein, for each physical uplink shared channel message of the plurality of physical uplink shared channel messages, one or more respective communication parameters are determined through a correspondence between a respective transmission configuration indicator state associated with the respective control resource set identifier of the respective control resource set comprising the downlink control information message that schedules the uplink shared channel message and one of the respective transmission configuration indicator states configured for the plurality of reference signal resource sets, the one or more respective communication parameters being determined from the respective resource set configuration of the plurality of resource set configurations corresponding to the one of the respective transmission configuration indicator states.

10. The network entity of claim 9, wherein the instructions are further executable by the at least one processor to cause the network entity to:

transmit, via a first transmission reception point of the plurality of transmission reception points, a first message comprising a first control resource set identifier of the plurality of control resource set identifiers and activating a first transmission configuration indicator state for the first control resource set identifier, the first control resource set identifier corresponding to a first control resource set of the plurality of control resource sets; and transmit, via a second transmission reception point of the plurality of transmission reception points, a second message comprising a second control resource set identifier of the plurality of control resource set identifiers and activating a second transmission configuration indicator state for the second control resource set identifier, the second control resource set identifier corresponding to a second control resource set of the plurality of control resource sets.

11. The network entity of claim 10, wherein the instructions to transmit the plurality of downlink control information messages are executable by the at least one processor to cause the network entity to:

transmit, via the first transmission reception point in the first control resource set, a first downlink control information message of the plurality of downlink control information messages, wherein the first downlink control information message schedules a first physical uplink shared channel message of the plurality of physical uplink shared channel messages; and transmit, via the second transmission reception point in the second control resource set, a second downlink control information message of the plurality of downlink control information messages, wherein the second downlink control information message schedules a second physical uplink shared channel message of the plurality of physical uplink shared channel messages.

12. The network entity of claim 11, wherein:

the first transmission configuration indicator state is associated with the first control resource set identifier and is configured for a first reference signal resource set of the plurality of reference signal resource sets by a first resource set configuration of the plurality of resource set configurations; and the second transmission configuration indicator state is associated with the second control resource set identifier and is configured for a second reference signal resource set of the plurality of reference signal resource sets by a second reference signal resource set configuration of the plurality of resource set configurations.

13. The network entity of claim 12, wherein the instructions to receive the plurality of physical uplink shared channel messages are executable by the at least one processor to cause the network entity to:

receive the first physical uplink shared channel message, wherein the one or more communication parameters associated with the first physical uplink shared channel message are based at least in part on the first reference signal resource set; and receive the second physical uplink shared channel message, wherein the one or more communication parameters associated with the second physical uplink shared channel message are based at least in part on the second reference signal resource set.

14. The network entity of claim 9, wherein the instructions are further executable by the at least one processor to cause the network entity to:

transmit a first configuration associated with a first bandwidth part, the first configuration indicating a set of transmission configuration indicator states associated with the first bandwidth part;

transmit a message activating a second bandwidth part for communications by the UE; and communicate, via the second bandwidth part, according to at least one transmission configuration indicator state of the set of transmission configuration indicator states associated with the first bandwidth part.

15. The network entity of claim 14, wherein the instructions are further executable by the at least one processor to cause the network entity to:

transmit a second configuration associated with the second bandwidth part, wherein communicating according to the at least one transmission configuration indicator state is based at least in part on the second configuration indicating the first bandwidth part.

16. The network entity of claim 14, wherein the instructions are further executable by the at least one processor to cause the network entity to:

transmit, to the UE, a second set of transmission configuration indicator states associated with the second bandwidth part, wherein:

the set of transmission configuration indicator states are associated with uplink communications and the second set of transmission configuration indicator states are associated with downlink communications; or the set of transmission configuration indicator states are associated with downlink communications and the second set of transmission configuration indicator states are associated with uplink communications.

17. A method for wireless communication at a user equipment (UE), comprising:

receiving an indication of a plurality of resource set configurations, each resource set configuration of the plurality of resource set configurations corresponding to a respective reference signal resource set of a plurality of reference signal resource sets and configuring a respective transmission configuration indicator state for the respective reference signal resource set;

receiving a plurality of downlink control information messages, each downlink control information message of the plurality of downlink control information messages received via a respective control resource set of a plurality of control resource sets, each control resource set associated with a respective control resource set identifier of a plurality of control resource set identifiers; and transmitting a plurality of physical uplink shared channel messages, wherein, for each physical uplink shared channel message of the plurality of physical uplink shared channel messages, one or more respective communication parameters are determined through a correspondence between a respective transmission configuration indicator state associated with the respective control resource set identifier of the respective control resource set comprising the downlink control information message that schedules the uplink shared channel message and one of the respective transmission configuration indicator states configured for the plurality of reference signal resource sets, the one or more respective communication parameters being determined from the respective resource set configuration of the plurality of resource set configurations corresponding to the one of the respective transmission configuration indicator states.

18. The method of claim 17, further comprising:

receiving, from a first transmission reception point configured for the UE, a first message comprising a first control resource set identifier of the plurality of control resource set identifiers and activating a first transmission configuration indicator state for the first control resource set identifier, the first control resource set identifier corresponding to a first control resource set of the plurality of control resource sets; and receiving, from a second transmission reception point configured for the UE, a second message comprising a second control resource set identifier of the plurality of control resource set identifiers and activating a second transmission configuration indicator state for the second control resource set identifier, the second control resource set identifier corresponding to a second control resource set of the plurality of control resource sets.

19. The method of claim 18, wherein receiving the plurality of downlink control information messages comprises:

receiving, via the first control resource set and from the first transmission reception point, a first downlink control information message of the plurality of downlink control information messages, wherein the first downlink control information message schedules a first physical uplink shared channel message of the plurality of physical uplink shared channel messages; and receiving, via the second control resource set and from the second transmission reception point, a second downlink control information message of the plurality of downlink control information messages, wherein the second downlink control information message schedules a second physical uplink shared channel message of the plurality of physical uplink shared channel messages.

20. The method of claim 19, wherein:

the first transmission configuration indicator state is associated with the first control resource set identifier and is configured for a first reference signal resource set of the plurality of reference signal resource sets by a first resource set configuration of the plurality of resource set configurations; and the second transmission configuration indicator state is associated with the second control resource set identifier and is configured for a second reference signal resource set of the plurality of reference signal resource sets by a second reference signal resource set configuration of the plurality of resource set configurations.

21. The method of claim 20, wherein transmitting the plurality of physical uplink shared channel messages comprises:

transmitting the first physical uplink shared channel message, wherein the one or more communication parameters associated with the first physical uplink shared channel message are based at least in part on the first reference signal resource set; and transmitting the second physical uplink shared channel message, wherein the one or more communication parameters associated with the second physical uplink shared channel message are based at least in part on the second reference signal resource set.

22. The method of claim 17, further comprising:

receiving a first configuration associated with a first bandwidth part, the first configuration indicating a set of transmission configuration indicator states associated with the first bandwidth part;

receiving a message activating a second bandwidth part for communications by the UE; and communicating, via the second bandwidth part, according to at least one transmission configuration indicator state of the set of transmission configuration indicator states associated with the first bandwidth part.

23. The method of claim 22, further comprising:

receiving a second configuration associated with the second bandwidth part, wherein communicating according to the at least one transmission configuration indicator state is based at least in part on the second configuration indicating the first bandwidth part.

24. The method of claim 22, further comprising:

receiving a second set of transmission configuration indicator states associated with the second bandwidth part, wherein:

the set of transmission configuration indicator states are associated with uplink communications and the second set of transmission configuration indicator states are associated with downlink communications; or the set of transmission configuration indicator states are associated with downlink communications and the second set of transmission configuration indicator states are associated with uplink communications.

25. A method for wireless communication at a network entity, comprising:

transmitting, to a user equipment (UE) configured with a plurality of transmission reception points, an indication of a plurality of resource set configurations, each resource set configuration of the plurality of resource set configurations corresponding to a respective reference signal resource set of a plurality of reference signal resource sets and configuring a respective transmission configuration indicator state for the respective reference signal resource set;

transmitting, via the plurality of transmission reception points, a plurality of downlink control information messages, each downlink control information message of the plurality of downlink control information messages transmitted via a respective control resource set of a plurality of control resource sets, each control resource set associated with a respective control resource set identifier of a plurality of control resource set identifiers; and receiving, via the plurality of transmission reception points, a plurality of physical uplink shared channel messages, wherein, for each physical uplink shared channel message of the plurality of physical uplink shared channel messages, one or more respective communication parameters are determined through a correspondence between a respective transmission configuration indicator state associated with the respective control resource set identifier of the respective control resource set comprising the downlink control information message that schedules the uplink shared channel message and one of the respective transmission configuration indicator states configured for the plurality of reference signal resource sets, the one or more respective communication parameters being determined from the respective resource set configuration of the plurality of resource set configurations corresponding to the one of the respective transmission configuration indicator states.

26. The method of claim 25, further comprising:

transmitting, via a first transmission reception point of the plurality of transmission reception points, a first message comprising a first control resource set identifier of the plurality of control resource set identifiers and activating a first transmission configuration indicator state for the first control resource set identifier, the first control resource set identifier corresponding to a first control resource set of the plurality of control resource sets; and transmitting, via a second transmission reception point of the plurality of transmission reception points, a second message comprising a second control resource set identifier of the plurality of control resource set identifiers and activating a second transmission configuration indicator state for the second control resource set identifier, the second control resource set identifier corresponding to a second control resource set of the plurality of control resource sets.

27. The method of claim 26, wherein transmitting the plurality of downlink control information messages comprises:

transmitting, via the first transmission reception point in the first control resource set, a first downlink control information message of the plurality of downlink control information messages, wherein the first downlink control information message schedules a first physical uplink shared channel message of the plurality of physical uplink shared channel messages; and transmitting, via the second transmission reception point in the second control resource set, a second downlink control information message of the plurality of downlink control information messages, wherein the second downlink control information message schedules a second physical uplink shared channel message of the plurality of physical uplink shared channel messages.

28. The method of claim 27, wherein:

the first transmission configuration indicator state is associated with the first control resource set identifier and is configured for a first reference signal resource set of the plurality of reference signal resource sets by a first resource set configuration of the plurality of resource set configurations; and the second transmission configuration indicator state is associated with the second control resource set identifier and is configured for a second reference signal resource set of the plurality of reference signal resource sets by a second reference signal resource set configuration of the plurality of resource set configurations.

29. The method of claim 28, wherein receiving the plurality of physical uplink shared channel messages comprises:

receiving the first physical uplink shared channel message, wherein the one or more communication parameters associated with the first physical uplink shared channel message are based at least in part on the first reference signal resource set; and receiving the second physical uplink shared channel message, wherein the one or more communication parameters associated with the second physical uplink shared channel message are based at least in part on the second reference signal resource set.

30. The method of claim 25, further comprising:

transmitting a first configuration associated with a first bandwidth part, the first configuration indicating a set of transmission configuration indicator states associated with the first bandwidth part;

transmitting a message activating a second bandwidth part for communications by the UE; and communicating, via the second bandwidth part, according to at least one transmission configuration indicator state of the set of transmission configuration indicator states associated with the first bandwidth part.

* * * * *